US010361741B2

(12) United States Patent
Liu

(10) Patent No.: US 10,361,741 B2
(45) Date of Patent: Jul. 23, 2019

(54) MOBILE DEVICE ENCLOSURE SYSTEM

(71) Applicant: GoDirectInc.com, Inc., La Puente, CA (US)

(72) Inventor: Warren Liu, Chino, CA (US)

(73) Assignee: GoDirectInc.com, Inc., La Puente, CA (US)

( * ) Notice: Subject to any disclaimer, the term of this patent is extended or adjusted under 35 U.S.C. 154(b) by 21 days.

(21) Appl. No.: 15/442,572

(22) Filed: Feb. 24, 2017

(65) Prior Publication Data

US 2017/0170863 A1 Jun. 15, 2017

Related U.S. Application Data

(63) Continuation-in-part of application No. 14/495,851, filed on Sep. 24, 2014, now abandoned, which is a (Continued)

(51) Int. Cl.
*G06F 1/16* (2006.01)
*H04B 1/3888* (2015.01)
(Continued)

(52) U.S. Cl.
CPC ............ *H04B 1/3888* (2013.01); *A45C 11/00* (2013.01); *G06F 1/1626* (2013.01);
(Continued)

(58) Field of Classification Search
USPC ........ 206/320, 45.2, 45.23, 45.24, 576, 472, 206/473
See application file for complete search history.

(56) References Cited

U.S. PATENT DOCUMENTS 4,400,161 A 8/1983 Gulf
4,651,872 A 3/1987 Joyce
(Continued)

FOREIGN PATENT DOCUMENTS

AU 2011100684 7/2011
AU 2013100107 2/2013
AU 2013100108 2/2013

OTHER PUBLICATIONS

Notice of Allowance for U.S. Appl. No. 13/958,392, dated Dec. 9, 2013, 16 pages.
(Continued)

*Primary Examiner* — Jacob K Ackun
(74) *Attorney, Agent, or Firm* — Amin, Turocy & Watson, LLP

(57) ABSTRACT

A mobile device enclosure system is an apparatus system that protects a mobile device from the wear and tear associated with of daily usage without limiting the portability of the mobile device or the accessibility of said mobile device's hardware keys or charging ports. The apparatus system accomplishes this through the use of an inner case and an outer case. The inner case is enclosed within the outer case. The inner case partially surrounds the mobile device and functions as an attachment means for mounting to the outer case. The outer case houses both the inner case and the mobile device protecting them from accidental damage. The inner case is rotatably coupled to the outer case permitting the mobile device to be particularly oriented and positioned in order to enable facilitated viewing of the mobile device's display screen.

20 Claims, 28 Drawing Sheets

Related U.S. Application Data continuation of application No. 14/203,540, filed on Mar. 10, 2014, now Pat. No. 8,887,902, which is a continuation-in-part of application No. 13/958,392, filed on Aug. 2, 2013, now Pat. No. 8,708,140.

(60) Provisional application No. 61/678,941, filed on Aug. 2, 2012.

(51) Int. Cl.
*A45C 11/00* (2006.01)
*H04M 1/02* (2006.01)
*H04W 52/02* (2009.01)

(52) U.S. Cl.
CPC ..... *H04M 1/0216* (2013.01); *H04W 52/0254* (2013.01); *A45C 2011/003* (2013.01); *A45C 2200/15* (2013.01); *G06F 2200/1633* (2013.01); *Y02D 70/122* (2018.01)

(56) References Cited

U.S. PATENT DOCUMENTS

| | | | |
|---|---|---|---|
| 6,772,879 B1 | 8/2004 | Domotor | |
| 7,673,745 B2 | 3/2010 | Sirichai et al. | |
| 8,201,687 B2 | 6/2012 | Zeliff et al. | |
| 8,230,992 B2 | 7/2012 | Law et al. | |
| 8,312,991 B2 | 11/2012 | Diebel et al. | |
| 8,708,140 B2 * | 4/2014 | Liu | A45C 11/00 206/320 |
| 8,746,449 B2 | 6/2014 | Gallagher | |
| 8,783,458 B2 | 7/2014 | Gallagher | |
| 8,887,902 B1 * | 11/2014 | Liu | G06F 1/1628 206/320 |
| 8,887,910 B2 | 11/2014 | Ashley et al. | |
| 9,419,670 B2 * | 8/2016 | Fathollahi | H04B 1/3888 |
| 2008/0237432 A1 | 10/2008 | Patterson | |
| 2011/0203954 A1 | 8/2011 | Kroupa | |
| 2011/0215217 A1 | 9/2011 | De La Garza | |
| 2012/0012483 A1 | 1/2012 | Fan | |
| 2012/0043247 A1 | 2/2012 | Westrup | |
| 2012/0153116 A1 | 6/2012 | Harrison | |
| 2012/0217174 A1 | 8/2012 | Ting | |
| 2012/0224305 A1 | 9/2012 | Yoo | |
| 2013/0001107 A1 | 1/2013 | Armstrong | |
| 2013/0015088 A1 | 1/2013 | Wu | |
| 2013/0093304 A1 * | 4/2013 | Childs | A45C 11/00 312/240 |
| 2013/0126372 A1 | 5/2013 | Song | |
| 2013/0134061 A1 | 5/2013 | Wu et al. | |
| 2013/0213838 A1 | 8/2013 | Tsai et al. | |
| 2013/0264235 A1 | 10/2013 | Lin | |
| 2013/0264241 A1 | 10/2013 | McCosh et al. | |
| 2014/0291458 A1 * | 10/2014 | Hsu | G06F 1/1626 248/125.7 |
| 2017/0279478 A1 * | 9/2017 | Fathollahi | H04B 1/3888 |
| 2018/0269917 A1 * | 9/2018 | Fathollahi | H04B 1/3888 |

OTHER PUBLICATIONS

Notice of Allowance for U.S. Appl. No. 14/203,540, dated Jul. 18, 2014, 11 pages.
Office Action for U.S. Appl. No. 14/495,851 dated Jan. 15, 2015, 18 pages.
Final Office Action for U.S. Appl. No. 14/495,851 dated May 29, 2015, 11 pages.
Office Action for U.S. Appl. No. 14/495,851 dated Feb. 3, 2016, 12 pages.
Final Office Action for U.S. Appl. No. 14/495,851 dated Aug. 30, 2016, 19 pages.

\* cited by examiner

MOBILE DEVICE ENCLOSURE SYSTEM

CROSS REFERENCE TO RELATED APPLICATIONS

This application is a continuation-in-part of U.S. application Ser. No. 14/495,851, filed Sep. 24, 2014, which is a continuation of U.S. application Ser. No. 14/203,540, filed Mar. 10, 2014, issued as U.S. Pat. No. 8,887,902, which is a continuation-in-part of U.S. application Ser. No. 13/958,392, filed Aug. 2, 2013, issued as U.S. Pat. No. 8,708,140, which claims priority to U.S. Provisional application Ser. No. 61/678,941, filed Aug. 2, 2012, the entireties of each are incorporated herein by reference.

FIELD OF THE INVENTION

The present invention relates generally to an apparatus enclosure, more specifically to a mobile device enclosure that is configurable in a manner that allows for various viewable orientations of the enclosed mobile device while additionally providing protection form wear and tear.

BACKGROUND OF THE INVENTION

With the advent of new technology, people have become more reliant on mobile devices to enhance and facilitate their daily activities. Many of these mobile devices, such as tablet PCs, combine the function of several electronic devices into a singular device with a wide range of functionality. While these mobile devices have become essential for managing the daily lives of many people, their daily usage will oftentimes cause wear and tear on the device itself. In most situations, the signs of wear are merely cosmetic but if a user were to drop the device, irreparable damage can be caused the mobile device. This can oftentimes lead to expensive repair costs but more commonly will result in the device having to be completely replaced.

Although there exist several systems and methods for protecting these mobile devices from normal wear and tear and accidental damage, these systems often times limit the functionality of the mobile device. These existing system are generally designed to be external enclosures that envelope the mobile device, functioning as a protective barriers. The disadvantage with these systems is that they generally end up limiting the portability of the mobile device as well as the accessibility of charging ports and hardware keys. Furthermore, these existing systems make it difficult to utilize the mobile devices in alternative capacities, such as a stand along touch screen keyboards and viewing platforms due to the protective cover enclosing particular design features of the mobile device.

It is therefore the object of the present invention, to provide a mobile device enclosure system that is able to protect a mobile device from the wear and tear of daily usage without limiting the portability of the mobile device or the accessibility of said mobile device's hardware keys or charging ports. The present invention accomplishes this through the use of an inner sleeve or inner case and an outer case. The inner sleeve or case is enclosed within the outer case. The inner case surrounds and functions as a vehicle for mounting the mobile device to the outer case; the inner sleeve houses the mobile device and protects it from everyday wear and tear. The outer case houses both the inner case or sleeve and the mobile device protecting them from accidental damage. The inner case or sleeve is rotatably coupled to the outer case permitting the mobile device to be particularly oriented and positioned in order to enable facilitated viewing of the mobile device's display screen. Additionally, the configuration of the inner sleeve and the outer case permits the mobile device to be particularly oriented and positioned in order to conform to alternative configurations and display states if necessary.

BRIEF DESCRIPTIONS OF THE DRAWINGS

Figure 1:
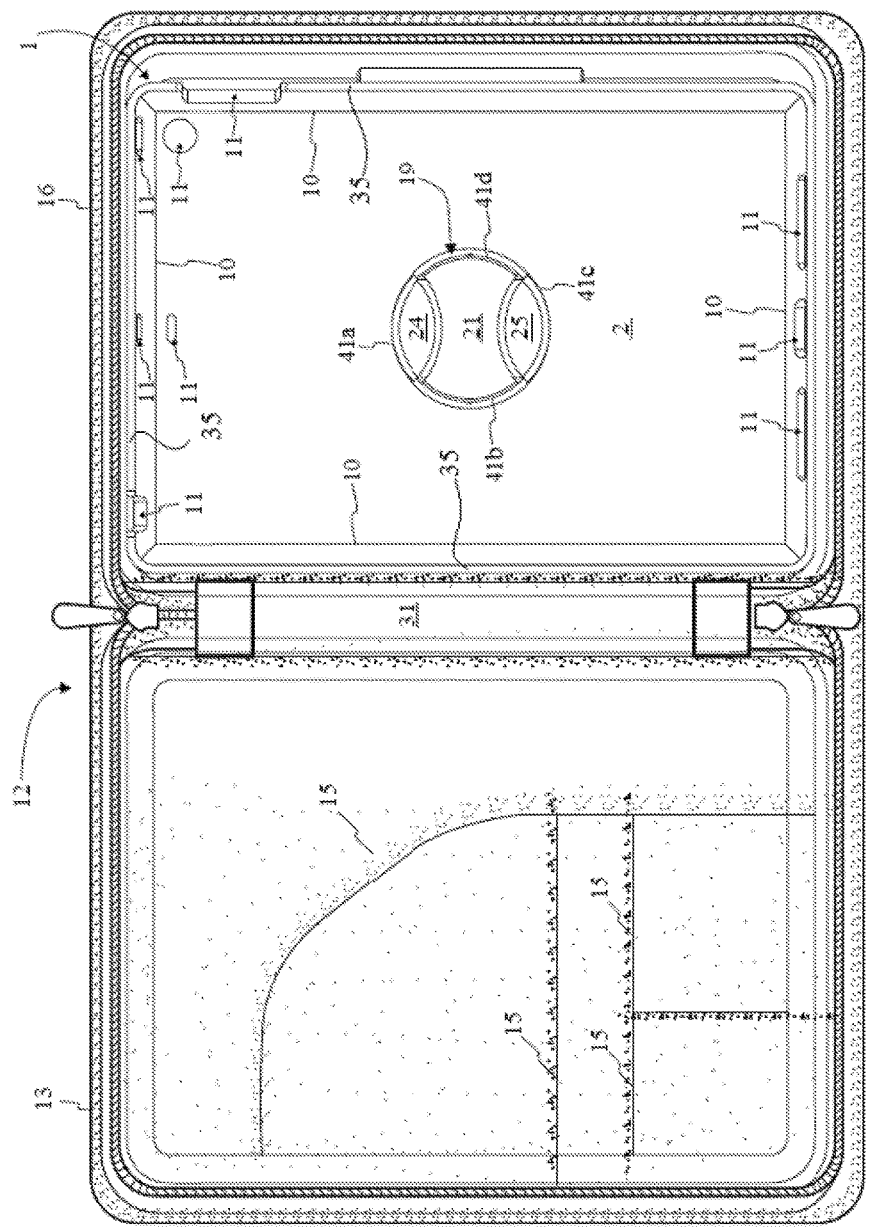
FIG. 1 is a top elevational view displaying the mobile device enclosure system in the clam shell configuration with the inner case attached to the outer case.
Figure 2:
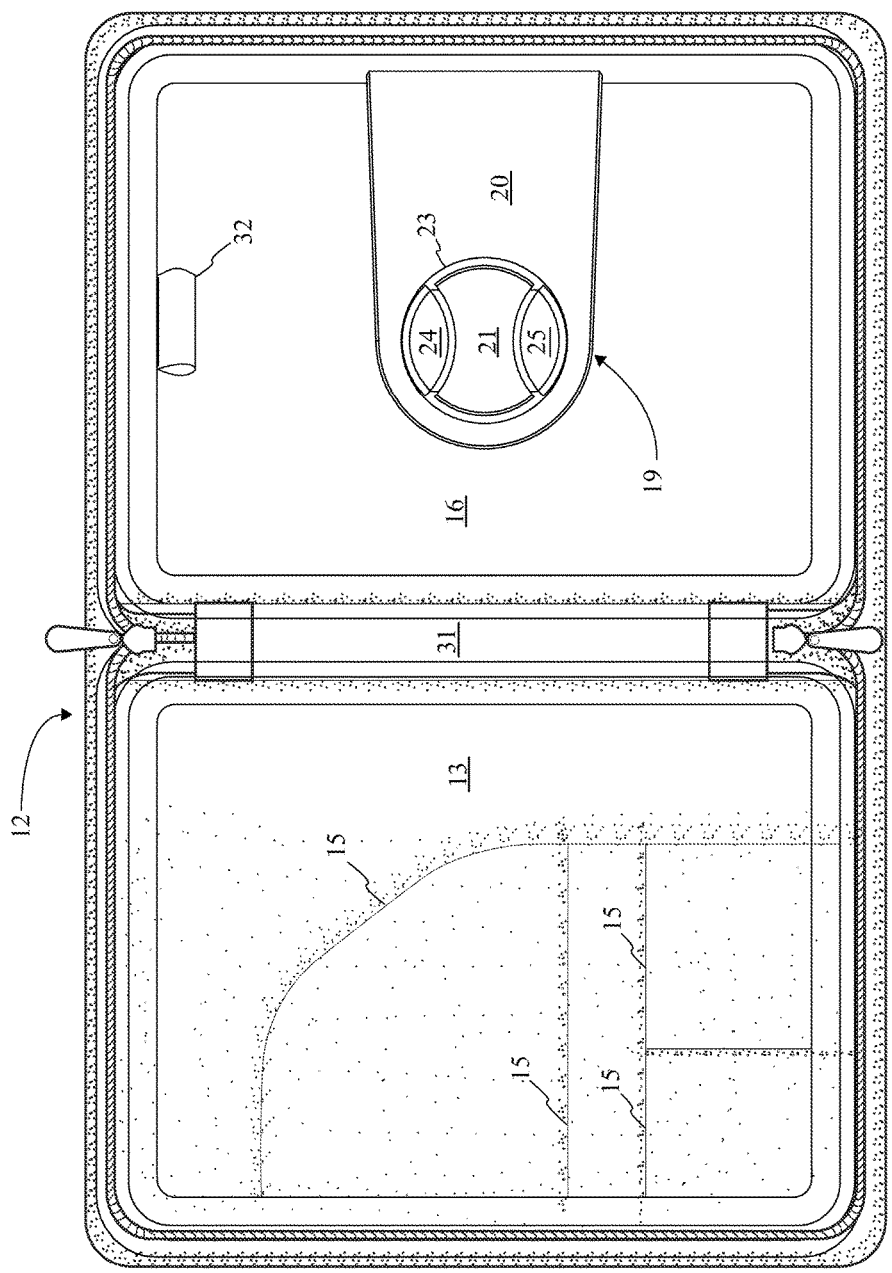
FIG. 2 is a top elevational view displaying the mobile device enclosure system in the clam shell configuration without the inner case attached to the outer case.
Figure 3:
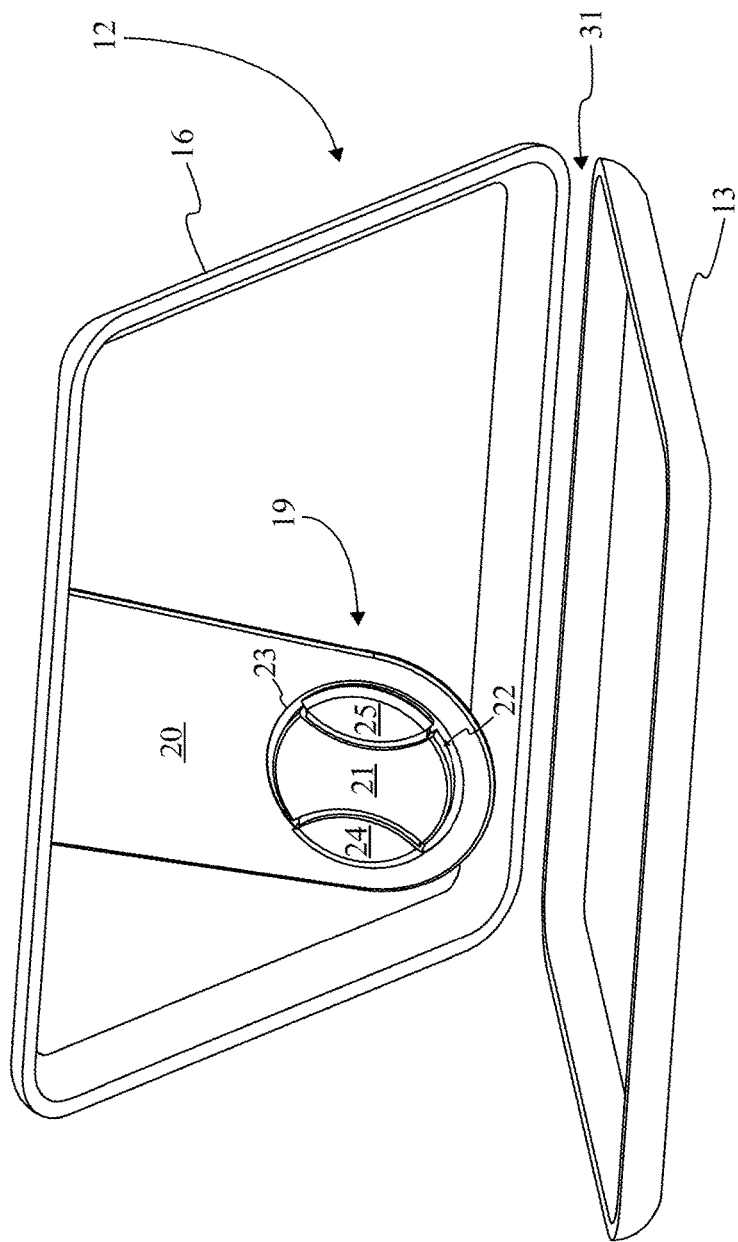
FIG. 3 is a perspective view displaying a representation of the mobile device enclosure system in the clam shell configuration angled for viewing without the inner case attached to the outer case.
Figure 14:
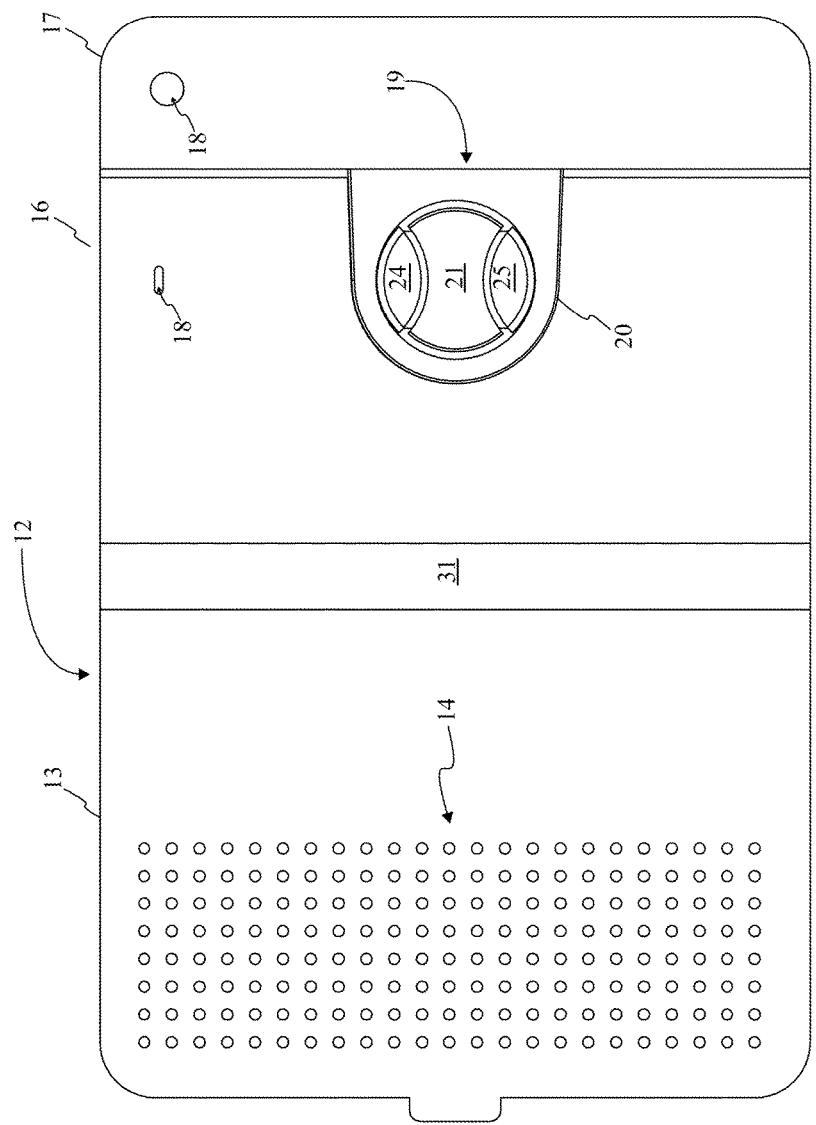
FIG. 14 is a top elevational view displaying the mobile device enclosure system in the folding book configuration without the inner case attached to the outer case.
Figure 15:
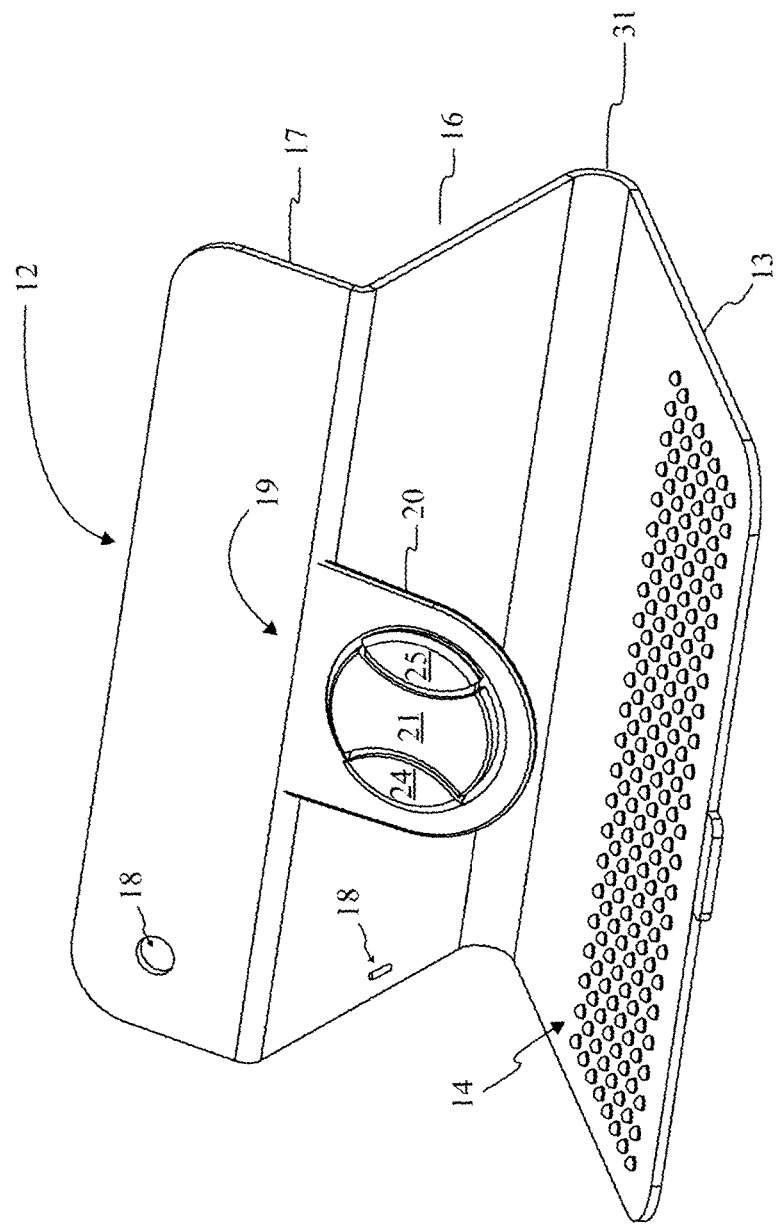
FIG. 15 is a perspective view displaying the mobile device enclosure system in the folding book configuration angled for viewing without the inner case attached to the outer case.
Figure 16:
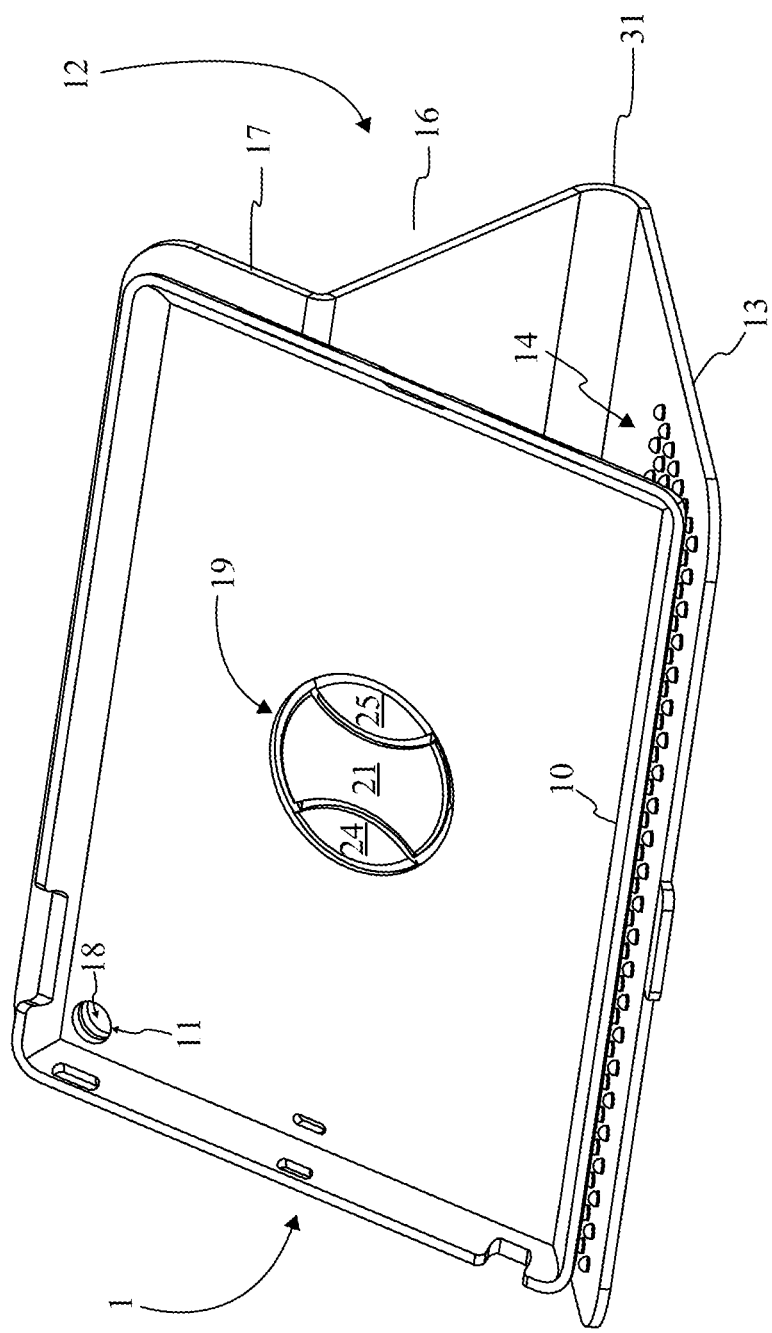
FIG. 16 is a perspective view displaying the mobile device enclosure system in the folding book configuration angled for viewing with the inner case attached in a landscape view.
Figure 17:
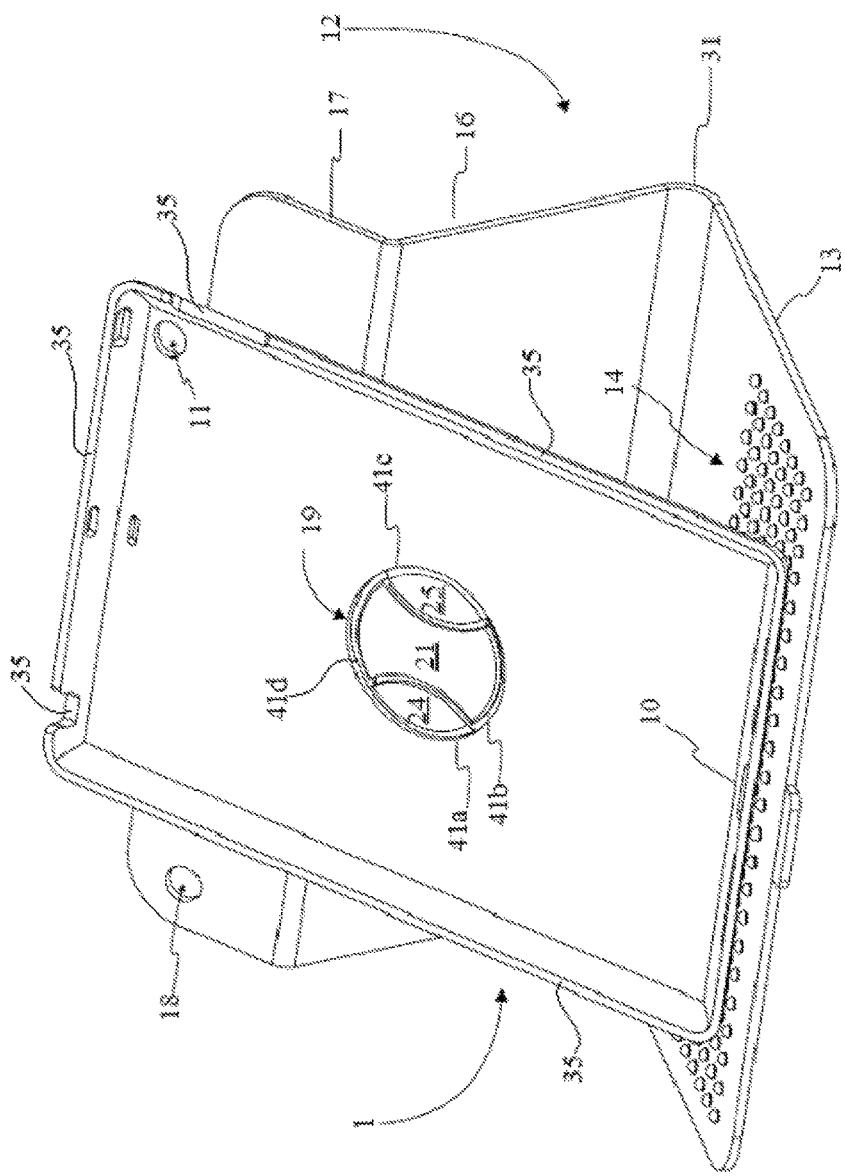
FIG. 17 is a perspective view displaying the mobile device enclosure system in the folding book configuration angled for viewing with the inner case attached in a portrait view.
Figure 27:
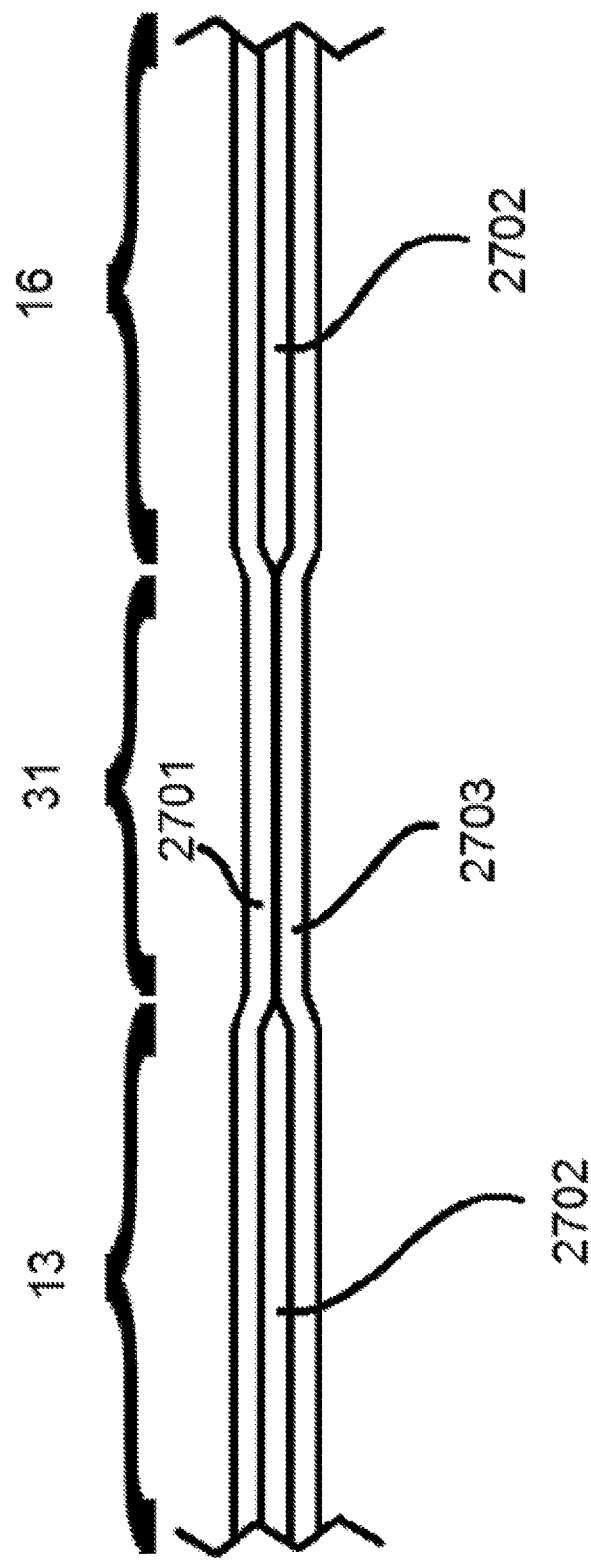

FIG. 27 is a partial cross section of any of FIG. 1, 2 or 14, taken horizontally across element 31 and extending partially into each of elements 13 and 16.

Figure 6:
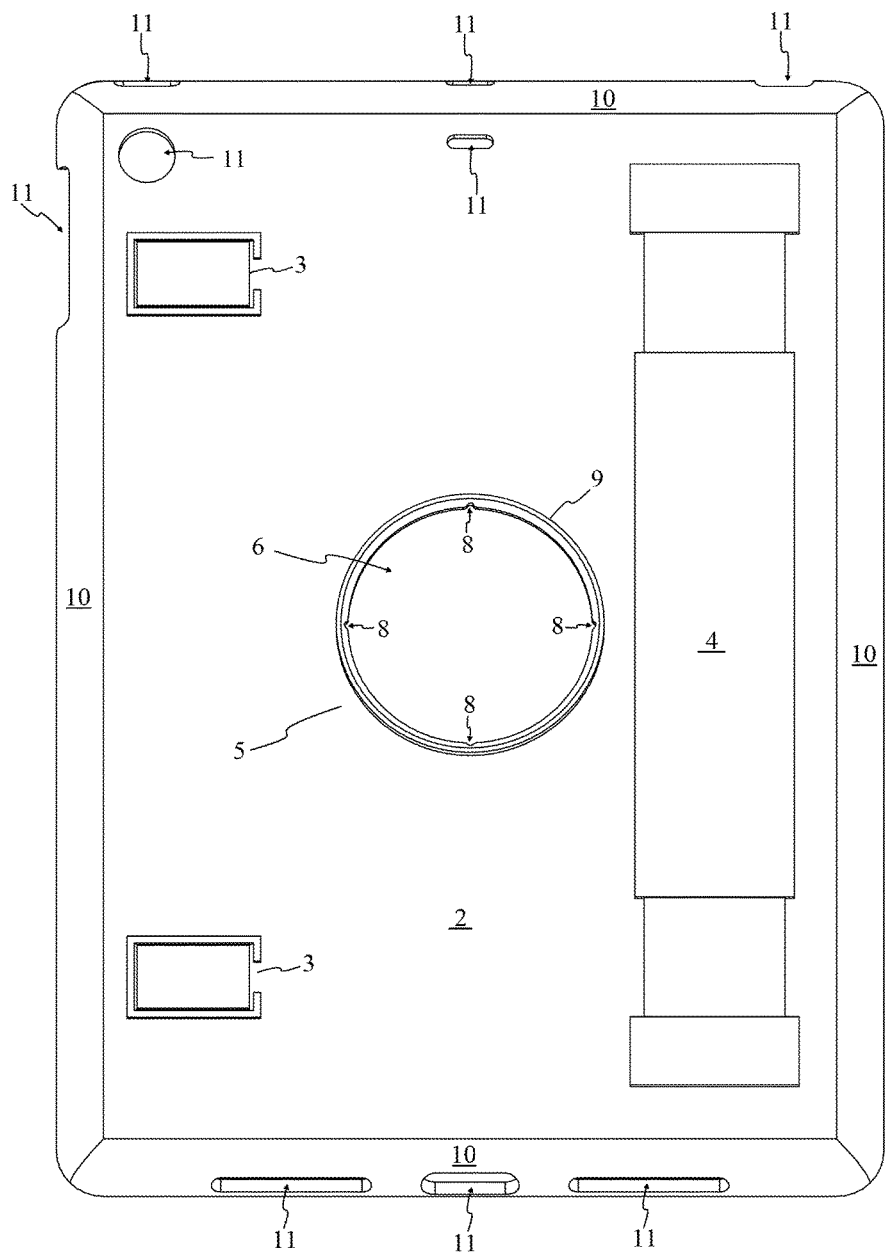
FIG. 6 is a perspective view displaying the rear portion of the inner case as per the current embodiment of the present invention.
Figure 28:
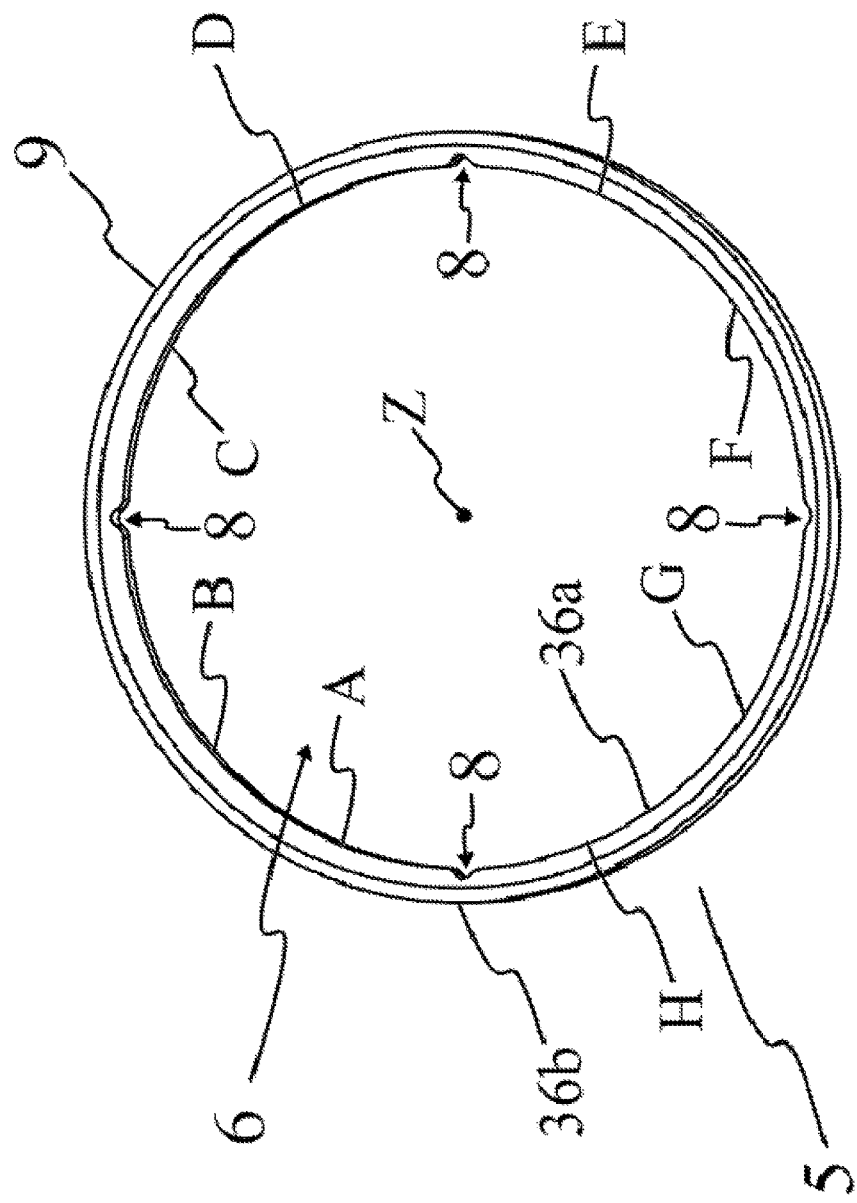

FIG. 28 is a larger view of the case mount appearing in FIG. 6.

DETAIL DESCRIPTIONS OF THE INVENTION

All illustrations of the drawings are for the purpose of describing selected versions of the present invention and are not intended to limit the scope of the present invention.

Referencing FIG. 1, the present invention is a mobile device enclosure system that protects a mobile device for the wear and tear associated with everyday usage without limiting said mobile device's portability or inhibiting access to said mobile device's hardware keys and charging ports. In the current embodiment of the present invention, the mobile device enclosure system comprises an inner case 1, an outer case 12, and an inner case coupler 19. The inner case 1 is a semi-rigid shell that couples to a mobile device without obstructing said mobile device's display screen or associated ports. The inner case 1 serves as an intermediary component enabling the mobile device to be rotatably attached to the inner case coupler 19. The inner case coupler 19 is pivotably coupled to the outer case 12. The outer case 12 forms a protective exterior for the mobile device while additionally providing features facilitating media viewing by a user.

Referencing FIG. 1 and FIG. 4-6, the inner case 1 peripherally engages a mobile device and covers the rear portion of the mobile device opposite its display screen. The inner case 1 detachably and rotatably engages the inner case coupler 19 enabling the enclosure and rotation to the outer case 12. In the current embodiment of the present invention, the inner case 1 comprises a rear panel 2, a case mount 5, sidewalls 10, and a plurality of port openings 11. The rear panel 2 is a flat section of the inner case 1 that rests against the rear portion of a mobile device. The rear panel 2 is formed to the specific shape of the rear portion of a mobile device. The sidewalls 10 are semi rigid structures peripherally positioned to the rear panel 2. The sidewalls 10 are particularly formed to laterally engage a mobile device without obstructing the display screen. The sidewalls 10 retain the mobile device within the inner case 1. The case mount 5 is a structural feature that detachably and rotatably engages the inner case coupler 19. The case mount 5 is centrally positioned on the rear panel 2. The plurality of port openings 11 are particularly excised regions of the sidewalls 10 and the rear panel 2 that provide access to the functionally important ports and hardware keys of a mounted mobile device.

Referencing FIG. 4-7, the rear panel 2 rests against the rear portion of a mobile device. The sidewalls 10 are positioned perimetrically around the rear panel 2. The sidewalls 10 extend generally perpendicularly to the rear panel 2, wherein the sidewalls 10 extend in away from the rear panel 2 but curve to form the particular contours allowing engagement with lateral regions of a mobile device. The case mount 5 is found centrally positioned on the rear panel 2, wherein the central positioning of the case mount 5 with the rear panel 2 assists in the balance of the inner case 1 when coupled to the inner case coupler 19. In the current embodiment of the present invention, the rear panel 2 comprises at least one kickstand 3 and a hand strap 4. The at least one kickstand 3 and the hand strap 4 provide additional functionality to the inner case 1.

Referencing FIG. 3-8, the rear panel 2 is provided with an interior face side and an exterior face side. The interior face side of the rear panel 2 is coincident with the rear portion of the mobile device. The exterior face side of the rear panel 2 is adjacent with the inner case coupler 19, while the inner case 1 is enclosed within the outer case 12. The at least one kickstand 3 and the hand strap 4 are found positioned on the exterior face side of the rear panel 2. The at least one kickstand 3 and the hand strap 4 are not recessed into the exterior face side of the rear panel 2 resulting in the both the at least one kickstand 3 and the hand strap 4 being slightly raised. The hand strap 4 is provided as a mean of securing the inner case 1 to a user's hand facilitating the carrying, transportation, and handling of the mobile device with one hand. The hand strap 4 is found positioned opposite the at least one kickstand 3 across the positioning of the case mount 5. The at least one kickstand 3 allows the inner case 1 to be angled when rested on the rear panel 2. The angled positioning allows the mobile device mounted in the inner case 1 to operate as a keyboard. The at least one kickstand 3 is pivotably coupled to the rear panel 2. In the preferred embodiment of the present invention, the at least one kickstand 3 comprises two kickstands 3 operatively distributed on the rear panel 2 to facilitate the deployment of the inner case 1 in its angled configuration.

Referencing FIG. 6, the sidewalls 10 are structural elements that enable the engagement of the inner case 1 with the lateral portions of a mobile device. The sidewalls 10 are perimetrically positioned on the rear panel 2, wherein the sidewalls 10 are positioned around the exterior perimeter of the rear panel 2. The sidewalls 10 extend generally perpendicularly to the rear panel 2, wherein the sidewalls 10 extend in away from the rear panel 2 but curve to form the particular contours allowing engagement with lateral regions of a mobile device. In an embodiment of the present invention, the sidewalls 10 comprise integrated couplers that are particularly positioned on the sidewalls 10. The integrated couplers facilitate the secure retention of a mobile device to the inner case 1. The positioning of the integrated couplers is relative to the sidewalls 10 and mainly dependent on a coincident positioning with a mobile device.

Figure 4:
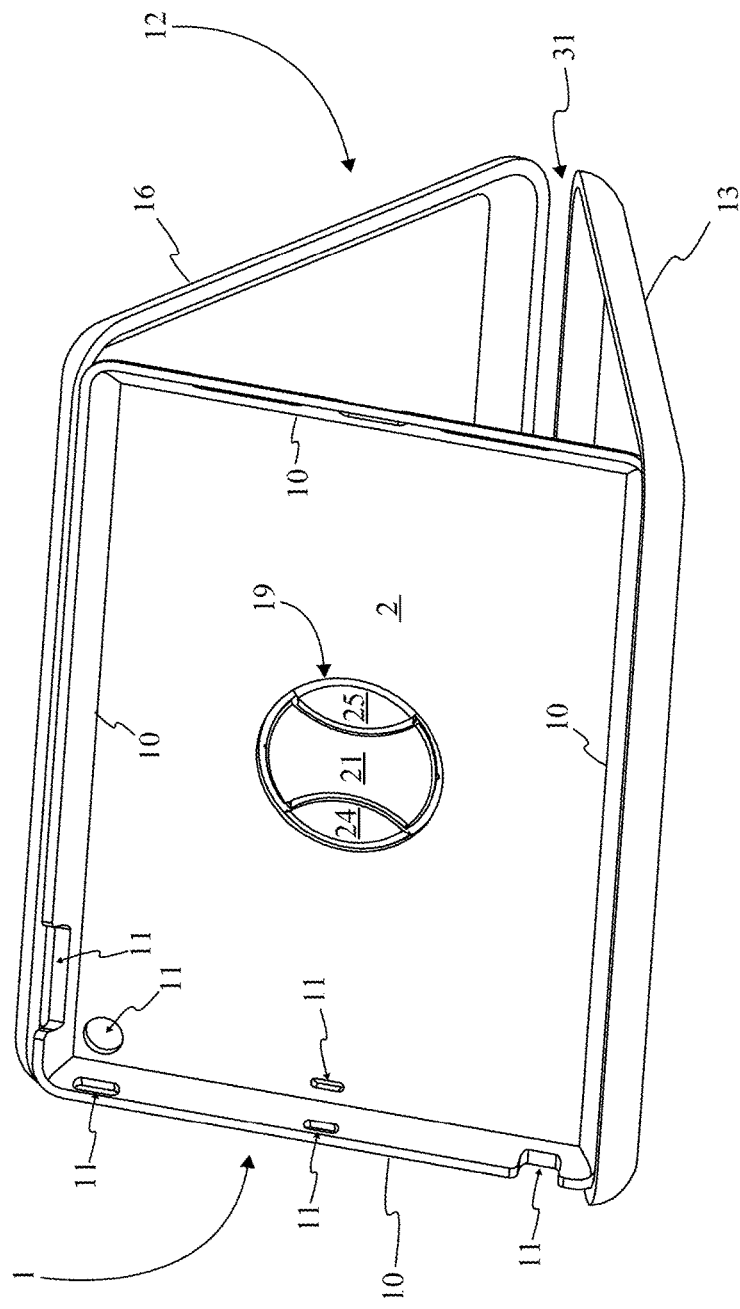
FIG. 4 is a perspective view displaying a representation of the mobile device enclosure system in the clam shell configuration angled for viewing with the inner case attached in a landscape view.
Figure 5:
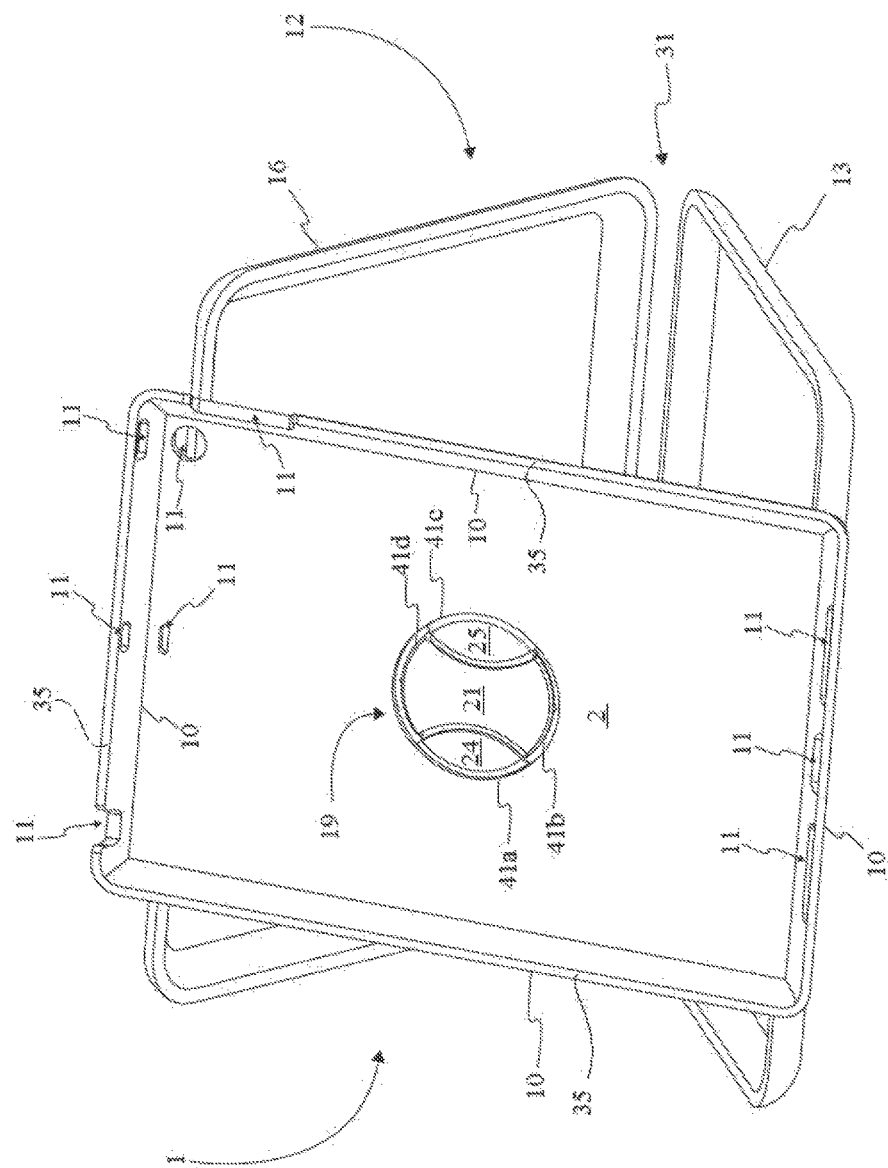
FIG. 5 is a perspective view displaying a representation of the mobile device enclosure system in the clam shell configuration angled for viewing with the inner case attached in a portrait view.

Referencing FIG. 4-6, the plurality of port openings 11 are particularly excised regions of the sidewalls 10 and the rear panel 2 that provide access to the functionally important ports and hardware keys of a mounted mobile device. The positioning of the plurality of port openings 11 is coincident with power and audio ports as well as hardware keys. The particular positioning of the plurality of port openings 11 is dependent on the particular placement of a mobile device's ports and hardware keys. The plurality of port openings 11 are voided spaces of the sidewalls 10 or the rear panel 2 that become coincident with the particular placement of a specific mobile device's ports and/or hardware keys.

Referencing FIG. 6-9, the case mount 5 is the structural component that enables a detachable and rotatable engagement between the inner case 1 and the inner case coupler 19. The case mount 5 is found positioned centrally on rear panel 2. The positioning of the case mount 5 on the rear panel 2 provides balance to the inner case 1 when coupled to the inner case coupler 19. In the current embodiment of the present invention the case mount 5 comprises an opening 6, a flange 7, at least two notch mounts 8, and a beveled rim 9. The opening 6 is a voided space that is traversed by a complementary component of the inner case coupler 19 utilized to detachably engage the inner case 1. The beveled rim 9 is an angled surface positioned adjacent to the flange 7 that facilities the traversal and engagement of inner case coupler 19 with the case mount 5. The flange 7 is a structural peripherally positioned around the opening 6. The flange 7 engages the inner case coupler 19 retaining the inner case 1 but permitting a rotatable engagement. The at least two notch mounts 8 are oppositely positioned mounting points that traverse both the flange 7 and the beveled rim 9. The at least two notch mounts 8 are utilized to secure the inner case 1 in a particular alignment while mounted with the inner case coupler 19.

Referencing FIG. 6-9, the opening 6 serves as an entry point for components of an inner case coupler 19 namely a housing 21, a first coupler 24, and a second coupler 25 that detachably and rotatably engage the case mount 5. The opening 6 is a voided space that traverses centrally through the rear panel 2. The opening 6 traverses centrally through the case mount 5 which subsequently provides the opening 6 with a central positioning on the rear panel 2. The positioning of the opening 6 provides even weight distribution to the inner case 1 when engaged to the inner case coupler 19.

Referencing FIG. 6-9, the flange 7 is an internal ridge that is provided as a retention point for securing the inner case coupler 19 to the case mount 5. The flange 7 is coincidentally engaged by complementary elements of the first coupler 24 and the second coupler 25, securing the inner case coupler 19 to the case mount 5 in a particular position. The flange 7 is peripherally positioned around the opening 6 and extends centrally into the opening 6. The flange 7 is positioned immediately adjacent to the beveled rim 9. The beveled rim 9 is a structural element that facilitates the traversal of the first coupler 24 and the second coupler 25 through the opening 6 and subsequently facilitates the engagement of the first coupler 24 and the second coupler 25 with the flange 7. The flange 7 and the beveled rim 9 both share a central alignment with the opening 6. While the flange 7 is positioned peripherally around the interior of the opening 6, the beveled rim 9 is positioned coincident with the exterior surface of the rear panel 2 and partially extends into the opening 6 becoming coincident with the flange 7. The beveled rim 9 is engaged by the inner case coupler 19 and is utilized to retain the first coupler 24 and the second coupler 25 against the flange 7. The beveled rim 9 comprises a chamfered edge. The chamfered edge is the angled portion of the beveled rim 9 that facilitates the traversal of the first coupler 24 and the second coupler 25. The chamfered edge has a bias towards the interior surface of the rear panel 2, wherein the angle of the chamfered edge slopes towards the interior surface facilitating traversal of the first coupler 24, the second coupler 25, and the housing 21 directionally towards the interior surface of the rear panel 2.

Referencing FIG. 6-9, the at least two notch mounts 8 are formed indents that secure the first coupler 24 and the second coupler 25 to the case mount 5. The at least two notch mounts 8 become coincident with a notch 26 of the first coupler 24 and another notch 26 of the second coupler 25. In order to accomplish this engagement the at least two notch mounts 8 are found peripherally positioned to the opening 6. The at least two notch mounts 8 accomplish this positioning by traversing through the flange 7 and the beveled rim 9. Each notch mount 8 of the at least two notch mounts 8 are positioned oppositely across the opening 6. Referencing FIG. 4-5 and FIG. 16-17, the opposite positioning of each notch mount 8 of the at least two notch mounts 8 ensure at least two secure alignments for the inner case 1 when mounted to the outer case 12.

Referencing FIG. 1-5 and FIG. 12-17, the outer case 12 is a protective exterior for the mobile device that additionally provides features facilitating media viewing by a user. The outer case 12 encloses the inner case 1. The inner case coupler 19 is pivotably coupled to the outer case 12. The engagement between the outer case 12 and the inner case coupler 19 provides a detachable and rotatable mounting point for the inner case 1. In the current embodiment of the present invention, the outer case 12 comprises a first flap 13, a second flap 16, and a folding region 31. The first flap 13 is the portion of the outer case 12 that folds over the inner case 1 becoming adjacently positioned to the display screen of the mobile device. The second flap 16 is the portion of the outer case 12 that is mostly adjacent to the rear panel 2 of the inner case 1. The second flap 16 provides a pivotable mounting point for the inner case coupler 19. The first flap 13, the second flap 16, and the folding region 31 peripherally surround the inner case 1. The folding region 31 is an area of the outer case 12 that is comparatively more flexible than both the first flap 13 and the second flap 16. The folding region 31 functions as a hinge for the outer case 12 allowing the first flap 13 and the second flap 16 to fold between an open position and a closed position. The open position is observed when the first flap 13 and the second flap 16 are positioned generally coplanar to one another. The closed position is observed when the first flap 13 and the second flap 16 are positioned mostly parallel where the first flap 13 is found oppositely positioned to the second flap 16 across the inner case 1.

Referencing FIG. 2, in an embodiment of the present invention, the outer case 12 comprises a plurality of accessory mounts 32. The plurality of accessory mounts 32 are particularly positioned on the outer case 12 in a manner that does not interfere with its functionality. The plurality of accessory mounts 32 provide a user with a particular engagement to connect specific accessory associated with a mobile device. The specific accessories can include a stylus or a memory card.

Referencing FIG. 14-17, in an embodiment of the present invention, the outer case 12 comprises accessory openings 18. The accessory openings 18 are particularly excised regions of the outer case 12 that are coincidentally aligned with port openings 11 of the plurality of port openings 11. The accessory openings 18 provide access to the functionally important ports and hardware keys of a mounted mobile device. The positioning of the accessory openings 18 coincides with the plurality of port openings 11 in order to allow access to power and audio ports as well as hardware keys while the mobile device is enclosed within the outer case 12.

Referencing FIG. 1-5 and FIG. 12-17, the first flap 13 is the pivotably coupled to the second flap 16 by way of the folding region 31. The folding region 31 serves as a hinge allowing the first flap 13 and the second flap 16 to fold into an open position and a closed position, as well as intermediate positions that enables the outer case 12 to function as a media viewing stand while a mobile device is coupled. Referencing FIG. 1 and FIG. 2, in the current embodiment of the present invention the first flap 13 contains a plurality of accessory pockets 15 that allow a user to easily store accoutrements for the mobile device such as, charging cables or screen wipes, but can additionally provide a quick storage location for business cards or other items.

Referencing FIG. 13-17, in an embodiment of the present invention, the first flap 13 comprises an inner case retainer 14. The inner case retainer 14 is a mount or a non-slip surface that becomes coincident with the inner case 1 while it is engaged to the inner case coupler 19. Due to the pivotable engagement of the inner case coupler 19 to the second flap 16 the inner case 1 is able to be secured with a particular angular positioning that facilitates viewing of media on the mobile device's display screen. The inner case retainer 14 is a detachable engagement that reduces unwanted obstruction to the display screen. It should be noted that the inner case retainer 14 can be incorporated into a clam shell case configuration and a folding book configuration of the outer case 12.

Referencing FIG. 2-3, FIG. 7-11, and FIG. 14-15, the inner case coupler 19 is provided as a means of rotatably and detachably engaging the case mount 5 of the inner case 1. The inner case coupler 19 is found pivotably coupled to the second flap 16. The pivotable coupling of the inner case coupler 19 to the second flap 16 allows the inner case coupler 19 to pivot at different angles enabling the repositioning of an engaged inner case 1 in order to facilitate viewing of the display screen. In the current embodiment of the present invention, the inner case coupler 19 comprises a tab 20, a housing 21, a first coupler 24, and a second coupler 25. The tab 20 is provided as a means of pivotably connecting the housing 21 to the second flap 16. The housing 21 is a structure that is integrally coupled to the tab 20 that provides a mounting point for the first coupler 24 and the second coupler 25. The first coupler 24 and the second coupler 25 are symmetrically positioned across the housing 21 and function as the detachable engagement means for securing the case mount 5 to the inner case coupler 19.

Referencing FIG. 2-3, FIG. 7-11, and FIG. 14-15, the tab 20 is the portion of the inner case coupler 19 that provides a mounting point for the housing 21. The tab 20 is integrally coupled to the housing 21 securing the housing 21 in particular arrangement while preventing unwanted movement that would affect the functionality of the inner case coupler 19. The tab 20 is pivotably coupled to the second flap 16. The engagement point of the second flap 16 to the tab 20 is found positioned distal to the folding region 31 of the outer case 12, wherein the pivot point between the tab 20 and the second flap 16 is found opposite the folding region 31 across the second flap 16.

Referencing FIG. 14-17, in an embodiment of the present invention the tab 20 is pivotably coupled to the second flap 16 by way of a folding panel 17. The folding panel 17 is a pivotable portion of the second flap 16 that is positioned opposite the folding region 31 across the second panel. The folding panel 17 is provided as being coplanar to the tab 20. the coplanar positioning provides the tab 20 with a smaller profile that reduces the required size of the outer case 12. It should be noted that the folding panel 17 is a component associated with the folding book configuration of the present invention.

Referencing FIG. 7-11, the housing 21 is a structural feature that traverses the opening 6 of the case mount 5. The housing 21 serves as a mounting point for the first coupler 24 and the second coupler 25. the housing 21 is integrally coupled to the tab 20, wherein the integral coupling of to the tab 20, provides the housing 21 with a pivotable positioning relative to the second flap 16 while preventing unwanted movement that would affect the functionality of the inner case coupler 19. In the current embodiment of the present invention, the housing 21 comprises rounded walls 22 and a base section 23. The rounded walls 22 are the particularly formed exterior of the housing 21 that enables the housing 21 to traverse through the opening 6. The rounded walls 22 become coincident with the peripheral portion of the flange 7 and the beveled edge. The base section 23 of the housing 21 allows the housing 21 to be integrally coupled to the tab 20. The base section 23 is found positioned perpendicular to the rounded walls 22.

Referencing FIG. 7-11, the first coupler 24 and the second coupler 25 are the operative components that secure the inner case coupler 19 to the case mount 5. The first coupler 24 and the second coupler 25 traverse into the housing 21. The first coupler 24 and the second coupler 25 are symmetrically positioned with the housing 21. The symmetrical positioning provides that the first coupler 24 is positioned in a mirrored configuration to the positioning of the second coupler 25. The symmetrical positioning between the first coupler 24 and the second coupler 25 allows the components to function cooperatively with one another while they engage the flange 7 and the beveled rim 9. The first coupler 24 and the second coupler 25 are compressibly positioned to the housing 21 where the first coupler 24 and the second coupler 25 can be manipulated to move towards the interior of the housing 21, the compressible relation allows the first coupler 24 and the second coupler 25 to traverse the opening 6 and disengage the flange 7 and the beveled rim 9 of the case mount 5.

Referencing FIG. 7-11, the first coupler 24 and the second coupler 25 each comprise a notch 26, a curved surface 27, a lip 28, a beveled top 29, and a finger mount 30. The notch 26 is a protrusion that coincidentally engages a notch mount 8 of the at least two notch mounts 8. The curved surface 27 is a peripheral wall whose curvatures align co-radially with the curvature of the rounded wall providing a generally flush engagement with the lateral portion of the flange 7 and the lateral portion of the beveled rim 9. The beveled top 29 is a structure with sloped feature that facilitates the traversal past the beveled rim 9 and the flange 7. The lip 28 is positioned between the beveled top 29 and the curved surface 27. The lip 28 extends perpendicularly to the curved surface 27. The lip 28 is retained against the flange 7 while the inner case coupler 19 is engaged to the case mount 5. The finger mount 30 is provided as a specific user engageable feature that enables a user to manipulate the both the first coupler 24 and the second coupler 25.

Referencing FIG. 7-11, the curved surface 27 of the first coupler 24 and the curved surface 27 of the second coupler 25 become operatively aligned with the rounded walls 22 of the housing 21. The operative alignment is a co-radial relationship with the curvature of the rounded walls 22. the co-radial relationship permits the curved surface 27 of the first coupler 24 and the curved surface 27 of the second coupler 25 to cooperatively form a ring link area that become coincident with the lateral portion of the flange 7 and the beveled rim 9. The curved surface 27 is elastically retained against the base section 23. The elastic retention of the curved surface 27 to the base section 23 provides the particular position for the curved surface 27 with the rounded walls 22. The elastic retention enables the compressible movement of the first coupler 24 and the second coupler 25 resulting in the disengagement of the lip 28 with the flange 7. The curved surface 27 is positioned perpendicular to the base section 23 in order to allow the co-radial relationship with the rounded walls 22, as the rounded walls 22 are also found perpendicularly positioned to the base section 23. The curved surface 27 is elastically retained against the beveled rim 9 and the flange 7. When the case mount 5 is engaged to the inner case coupler 19 the curved surface 27 is found rotatably coincident with the lateral portions of the flange 7 and the beveled rim 9, where the lateral portions of the flange 7 and the beveled rim 9 are the surfaces of both that are immediately adjacent to the opening 6.

Referencing FIG. 7-11, the lip 28 is positioned perpendicularly to the curved surface 27. The positioning of the lip 28 is provided to ensure a coincident engagement with the flange 7. The lip 28 functions as an exterior ridge to the curved surface 27 and as such extends away from the curved surface 27. The lip 28 is positioned between the beveled top 29 and the curved surface 27, where the beveled top 29 is immediately adjacent to the curved surface 27 opposite the beveled top 29. The lip 28 is operatively retained against the flange 7. The operative engagement retains the lip 28 against the flange 7 preventing the inner case coupler 19 from detaching from the case mount 5.

Figure 7:
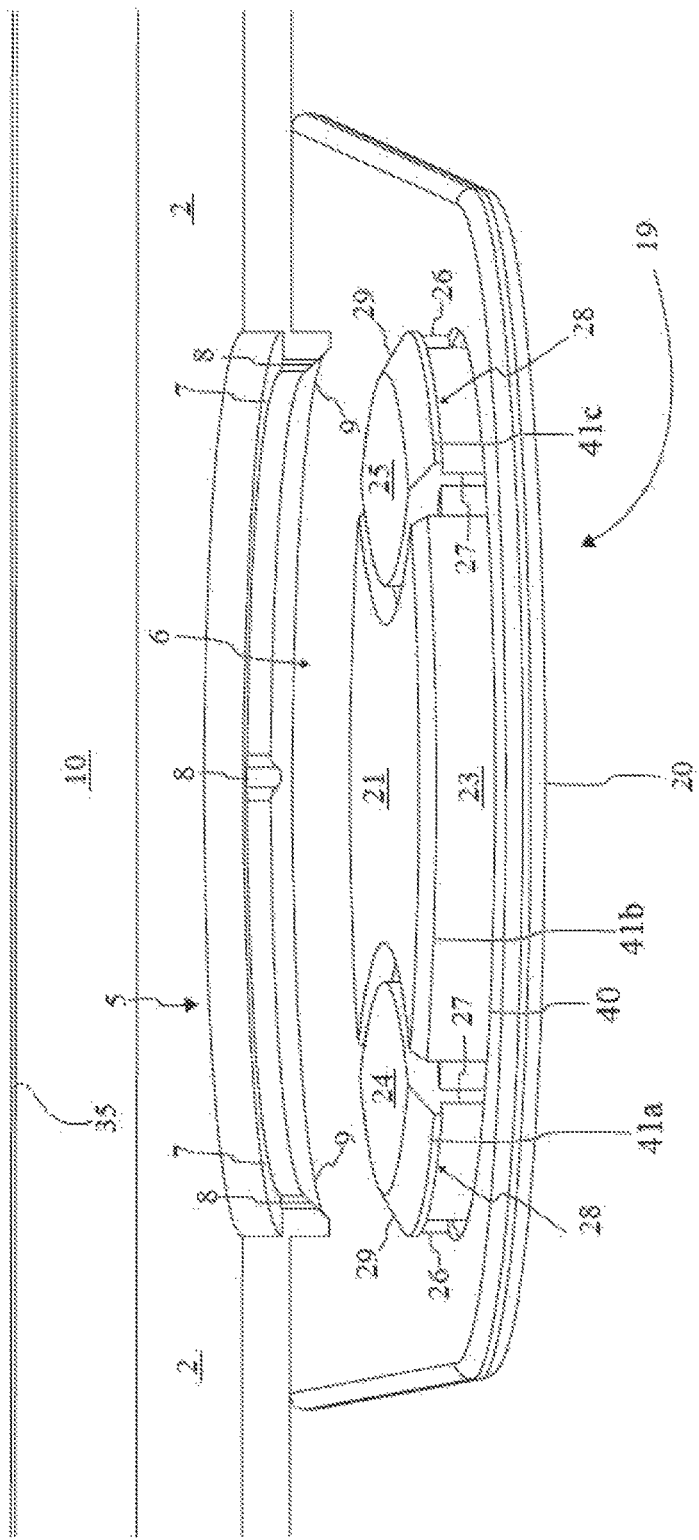
FIG. 7 is an enhanced view displaying the alignment of the case mount with the inner case coupler as per the current embodiment of the present invention.
Figure 8:
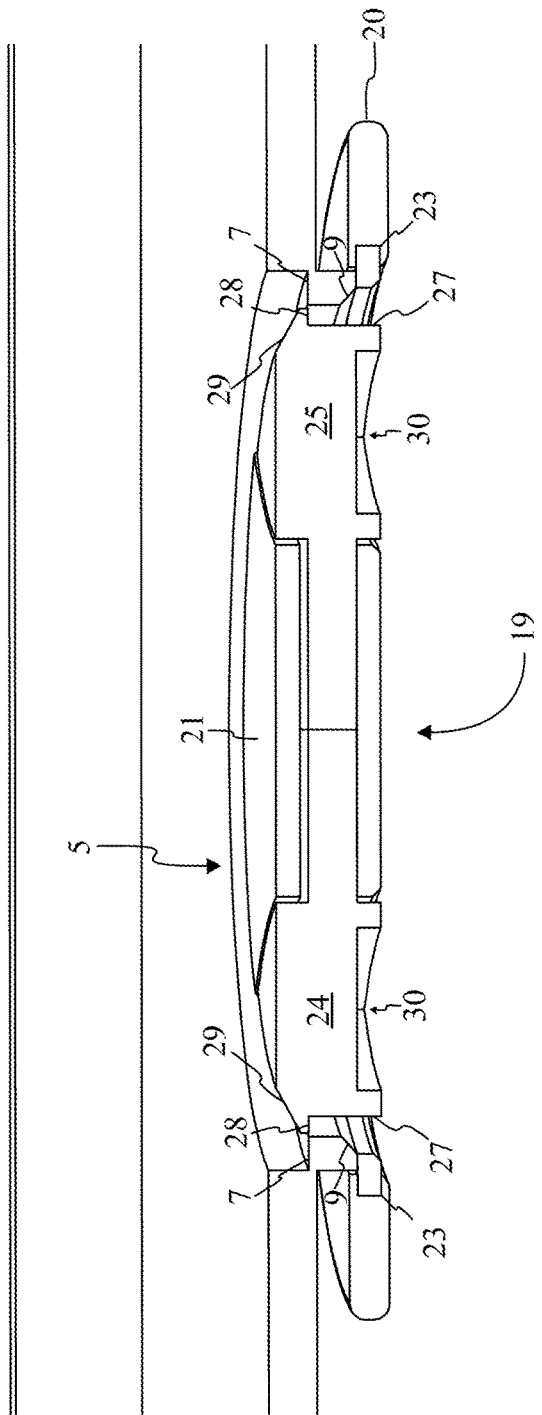
FIG. 8 is an enhanced sectional view displaying the case mount disengaged with the inner case coupler as per the current embodiment of the present invention.
Figure 9:
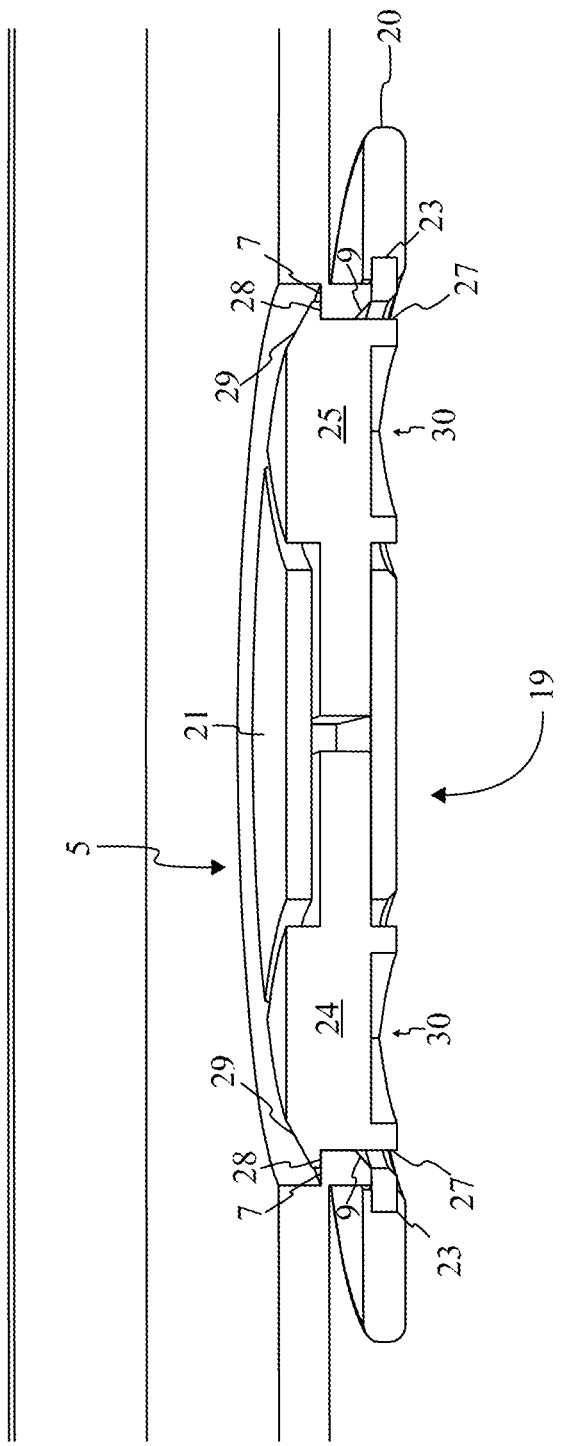
FIG. 9 is an enhanced sectional view displaying the case mount engaged with the inner case coupler as per the current embodiment of the present invention.
Figure 10:
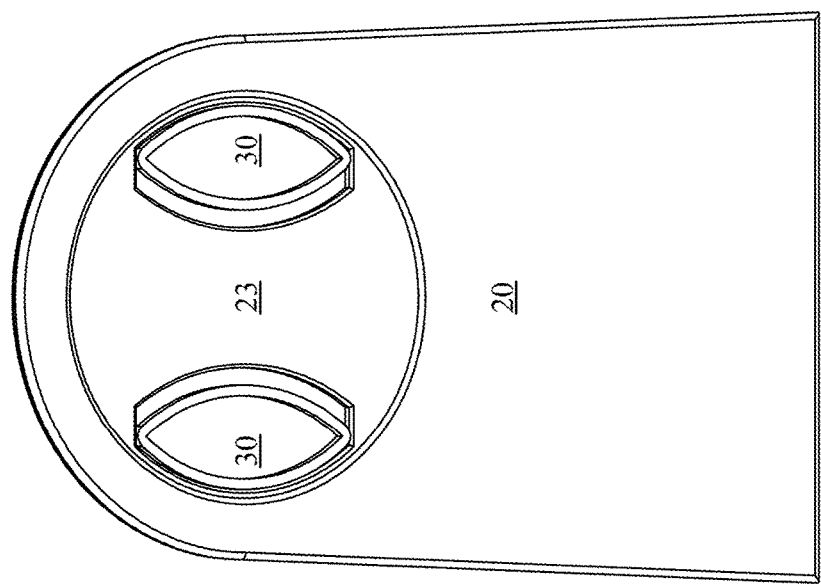
FIG. 10 is a perspective view displaying the positioning of the finger mounts of the first coupler and the second coupler while engaged to the case mount.
Figure 11:
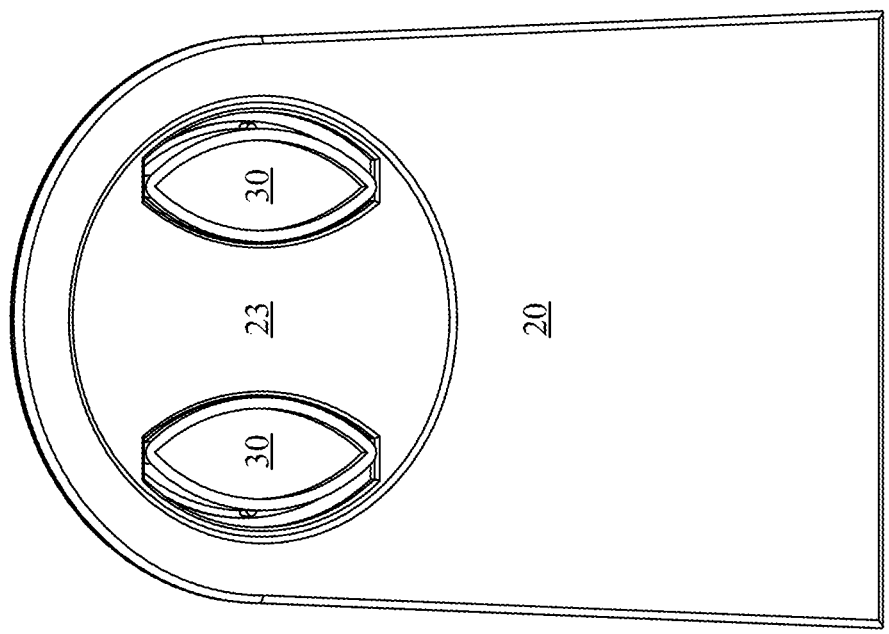
FIG. 11 is a perspective view displaying the positioning of the finger mounts of the first coupler and the second coupler while disengaged to the case mount.
Figure 12:
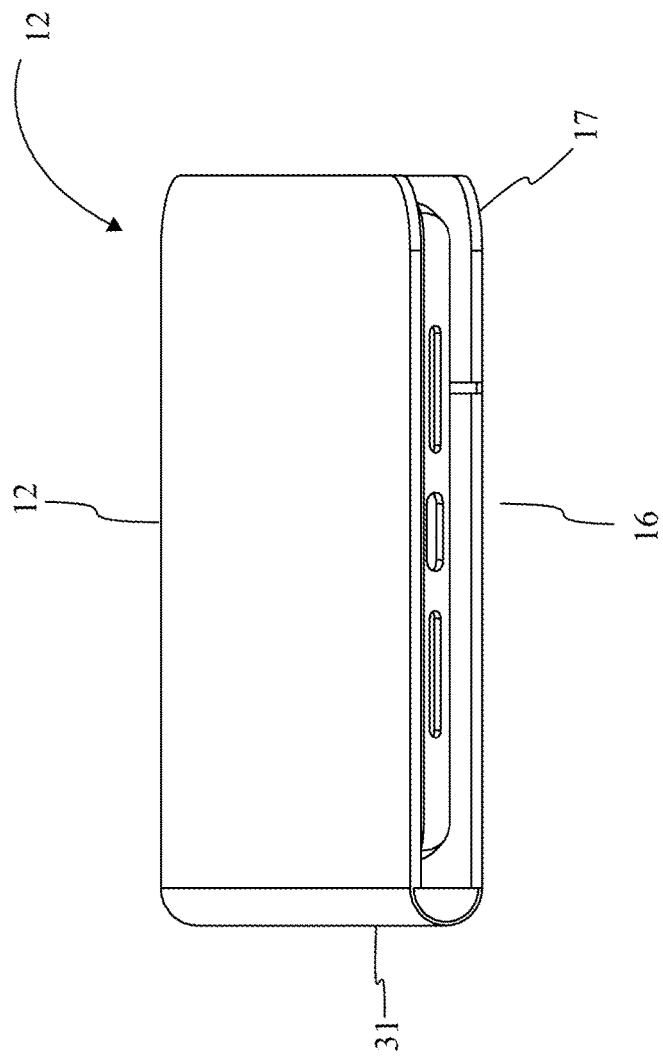
FIG. 12 is a perspective view displaying the mobile device enclosure system in the folding book configuration with the inner case enclosure within the outer case.
Figure 13:
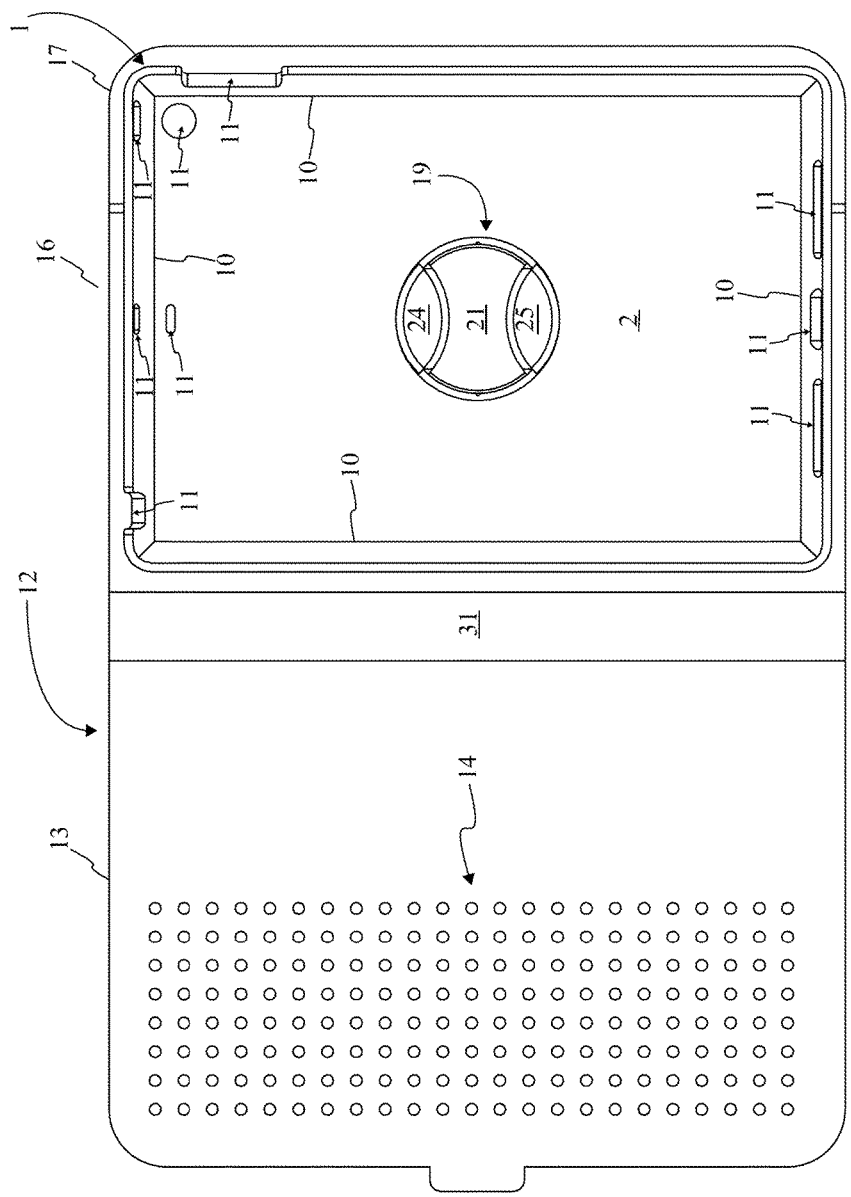
FIG. 13 is a top elevational view displaying the mobile device enclosure system in the folding book configuration with the inner case attached to the outer case.

Referencing FIG. 7-9, the notch 26 is peripherally positioned on the curved surface 27. The notch 26 of the first coupler 24 and the notch 26 of the second coupler 25 are positioned in a manner that results in a symmetrical alignment across the housing 21. The symmetrical alignment ensure that the notch 26 of the first coupler 24 and the notch 26 of the second coupler 25 become coincident with the positioning of the at least two notch mounts 8. the notches 26 are rotatably coincident with the at least two notch mounts 8 where the rotation of the case mount 5 about the inner case coupler 19 provides the notch 26 of the first coupler 24 and the notch 26 of the second coupler 25 becoming coincident with the positioning of the at least two notch mounts 8. The notch 26 is elastically retained against a notch mount 8 of the at least two notch mounts 8. The elastic retention of the notch 26 to the notch mount 8 locks the inner case 1 in a particular orientation that allows the inner case 1 to be particularly positioned in order to facilitate viewing of the media device's display screen.

Referencing FIG. 7-11, the beveled top 29 is the structure positioned immediately adjacent to the lip 28. The beveled top 29 facilitates the traversal past the beveled rim 9 and the flange 7 allowing the lip 28 to become coincident with the flange 7. The beveled top 29 is operatively aligned with the beveled rim 9. The beveled top 29 has a sloped edge that becomes coincident with the beveled rim 9. The sloped edge of the beveled top 29 engages the beveled rim 9 compressing the first coupler 24 and the second coupler 25 towards the interior of the housing 21. The compression of the first coupler 24 and the second coupler 25 allows the housing 21, the first coupler 24, and the second coupler 25 to traverse the opening 6 passing the beveled rim 9 and the flange 7. The beveled rim 9 and the flange 7 are operatively positioned between the lip 28 and the base section 23. The beveled top 29 and the base section 23 retain the lip 28 against the flange 7 providing a secure engagement.

Referencing FIG. 8-11, the finger mount 30 is provided as a specific user engageable feature that enables a user to manipulate the both the first coupler 24 and the second coupler 25. The finger mount 30 is positioned immediately adjacent to the curved surface 27. The finger mount 30 is moveably positioned within the base section 23. The base section 23 contains an excised area that is formed to receive the finger mount 30. The excised area adequately enables the finger mount 30 to move along a set path. The set path coincides with the movement of the first coupler 24 and the second coupler 25 as they are compressed when engaging the case mount 5 or disengaging from the case mount 5.

Figure 18:
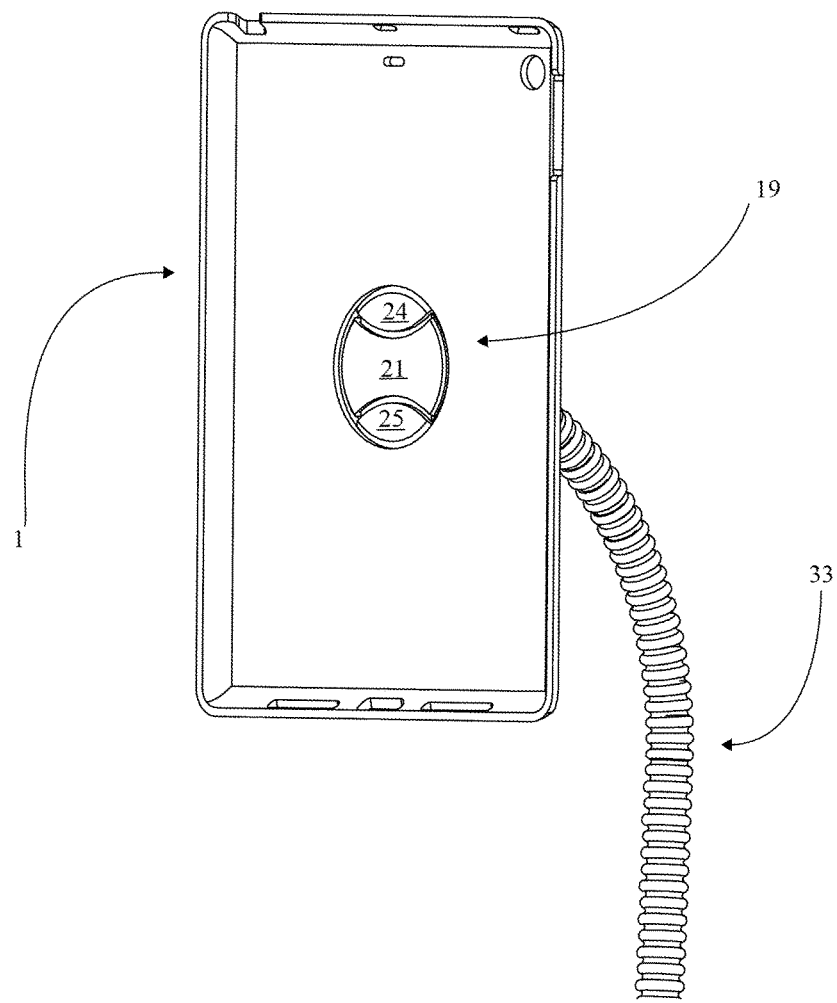
FIG. 18 is a perspective view displaying the inner case detachably and rotatably coupled to a modular mounting system by way of the inner case coupler.
Figure 19:
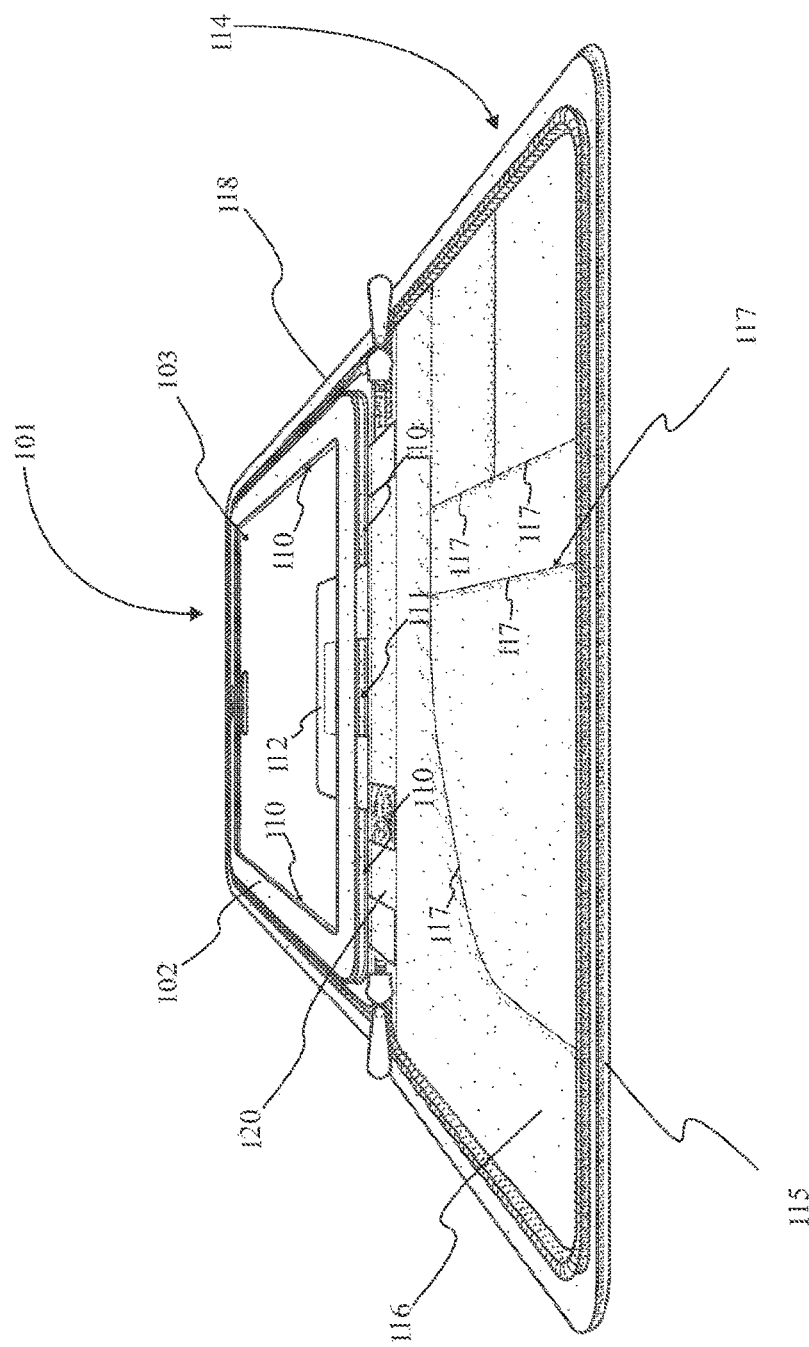
FIG. 19 is a perspective view displaying the inner sleeve attached to the outer case as per an embodiment of the present invention.
Figure 20:
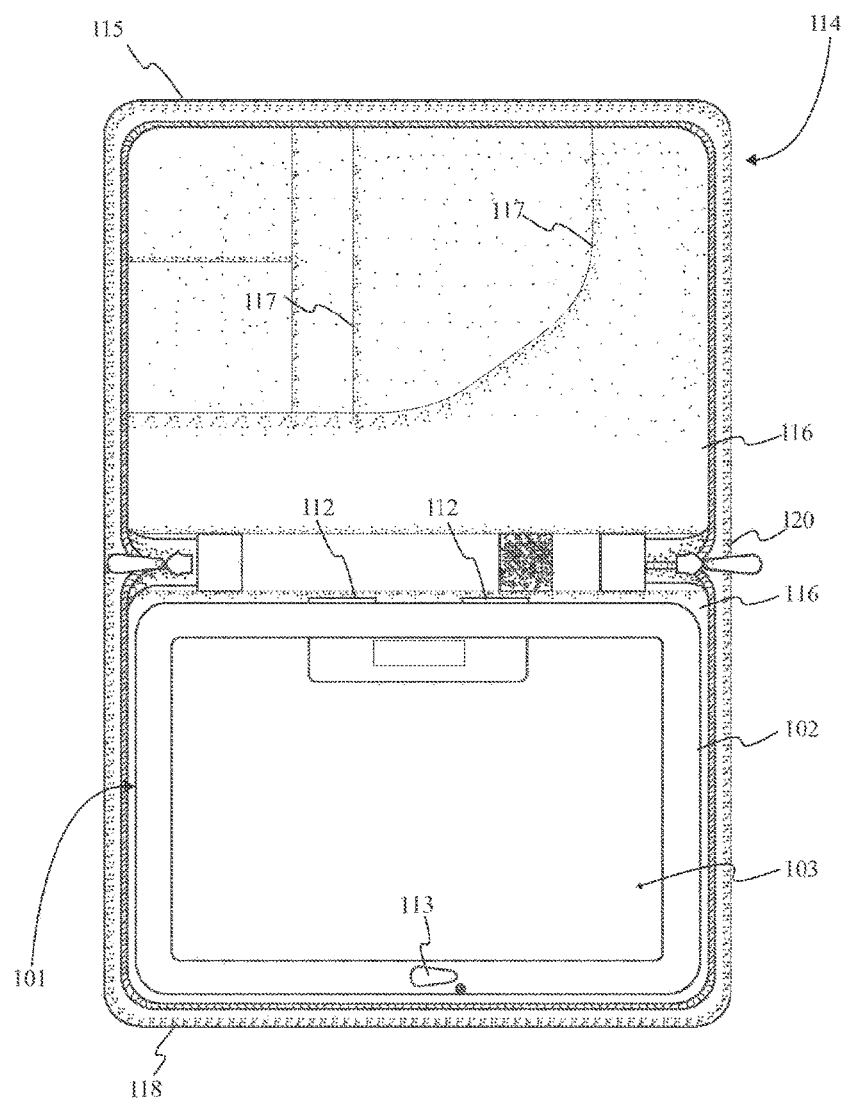
FIG. 20 is a top elevational view displaying the inner sleeve attached to the outer case as per an embodiment of the present invention.

Referencing FIG. 7-9 and FIG. 18, in an embodiment of the present invention, the inner case coupler 19 is provided as part of a modular system for attaching the inner case 1 to a plurality of modular mounting systems 33. In the aforementioned embodiment, the inner case coupler 19 is integrally coupled to the modular mounting system 33. The inner case coupler 19 comprises the housing 21, the first coupler 24, and the second coupler 25 while excluding the tab 20, as the attachment means between the inner case coupler 19 and the modular mounting system 33. The attachment means between the inner case coupler 19 and the modular mounting system 33 can be accomplished by a plurality of means. In FIG. 18, the inner case coupler 19 is coupled to the modular mounting system by way of an integral engagement to the housing 21. It should be noted that the aforementioned embodiment is provided as a one means of providing a modular system for detachably and rotatably securing a mobile device using an inner case 1 and a variation of the inner case coupler 19.

Referring to FIGS. 19-26, the mobile device enclosure system is a provided as a housing that protects a mobile device for the wear and tear associated with everyday usage without limiting said neither mobile device's portability or the inhibiting access to said mobile devices hardware keys and charging ports. In an embodiment of the present invention, the mobile device enclosure comprises an inner sleeve 101 and an outer enclosure 114. The inner sleeve 101 functions as a primary enclosure that retains the mobile device and protects said mobile device from minor wear and tear. It should be noted that minor wear and tear is used to describe wear and tear to a mobile device that would result in cosmetic damage. The outer enclosure 114 functions as a secondary enclosure which houses the inner sleeve 101 and the mobile device protecting both from major wear and tear as well as accidental damage. It should be noted that major wear and tear and accidental damage is used to describe serious damage to said mobile device requiring repair or replacement of components in order to allow the device to function properly. In order to provide this protection, the inner sleeve 101 is found detachably engaged within the outer enclosure 114. The detachable engagement between the inner sleeve 101 and the outer enclosure 114 additionally provides a rotatable coupling permitting the mobile device to be particularly arranged in alternative configurations for displaying videos in a landscape, horizontal orientation, or vertical, portrait orientation.

Figure 21:
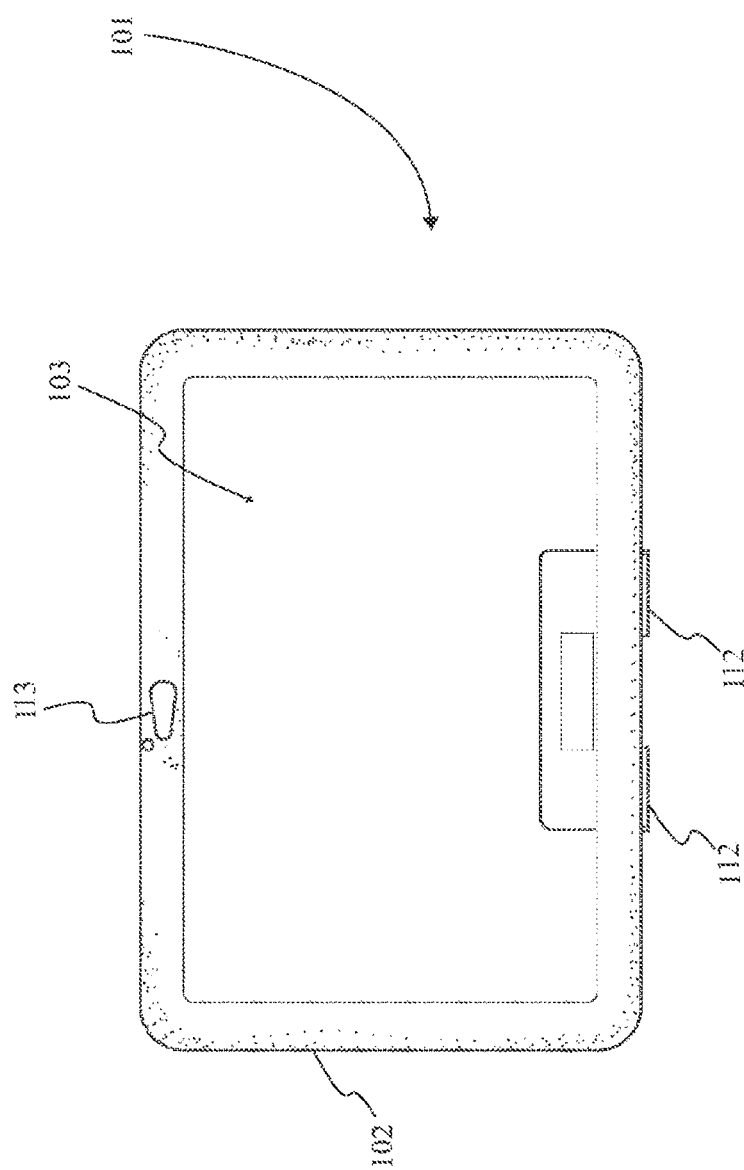
FIG. 21 is a top elevational view displaying the inner sleeve as per an embodiment of the present invention.
Figure 22:
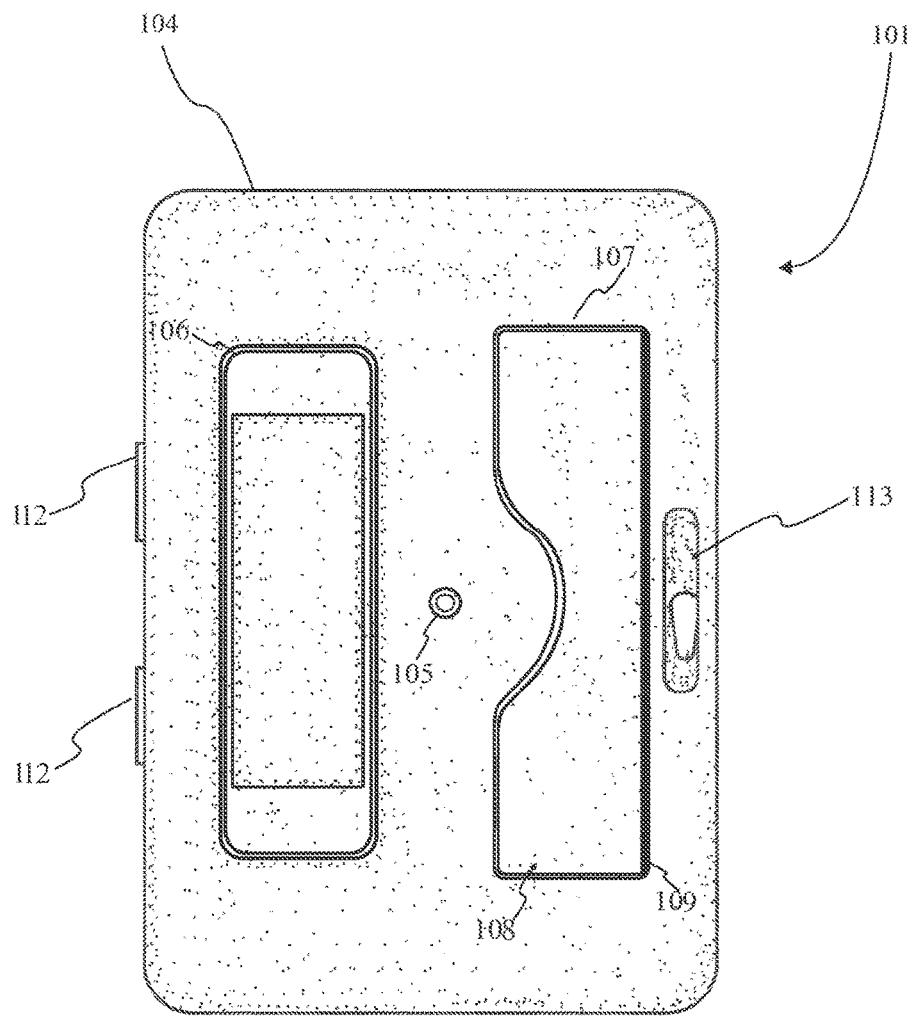
FIG. 22 is a bottom elevational view displaying the inner sleeve as per an embodiment of the present invention.
Figure 26:
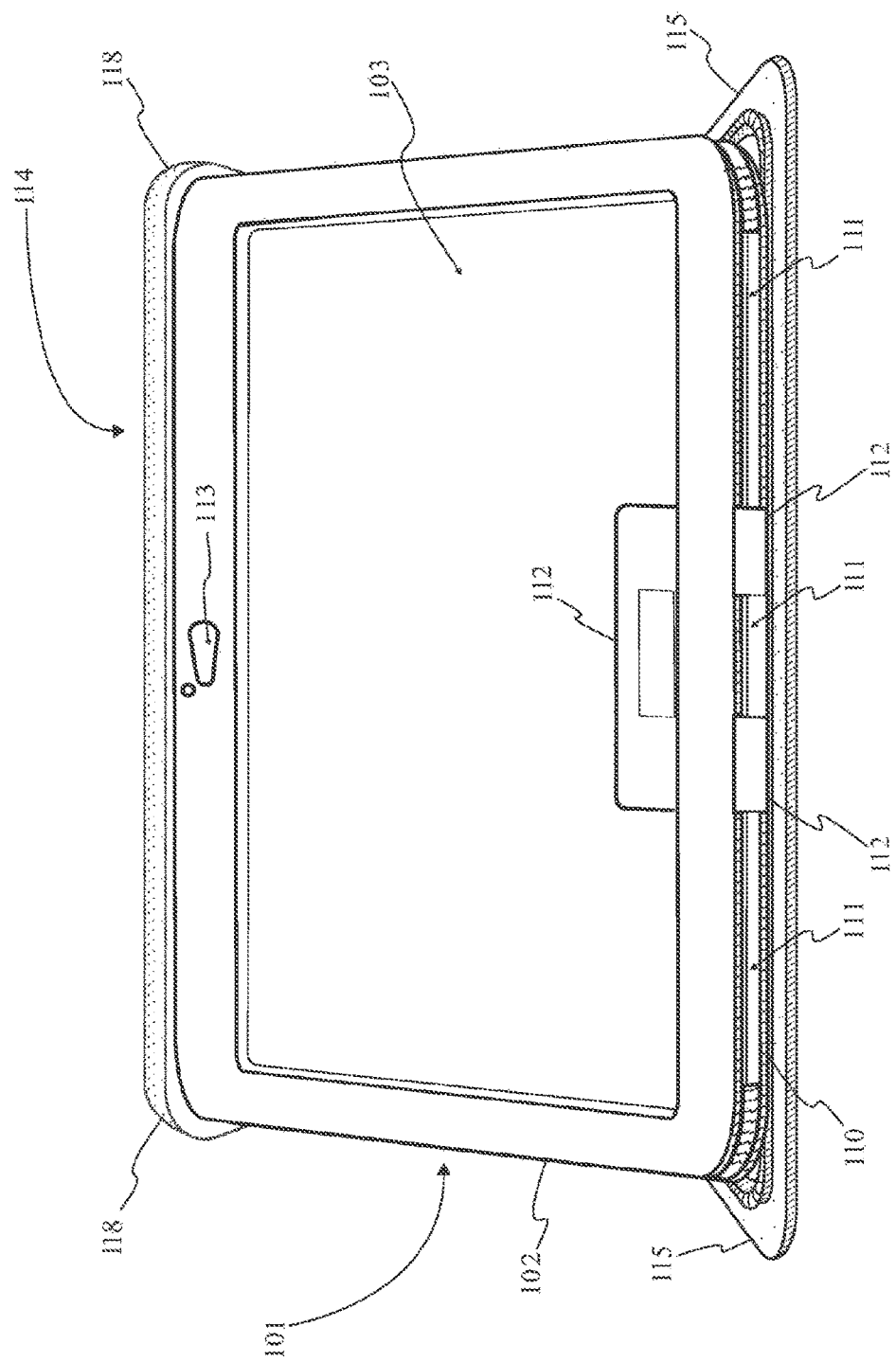
FIG. 26 is a perspective view displaying the inner sleeve mounted to the outer case in a landscape configuration as per an embodiment of the present invention.

Referencing FIG. 21, FIG. 22, and FIG. 26, the inner sleeve 101 is provided as the primary enclosure that protects the mobile device from minor wear and tear. In an embodiment of the invention, the inner sleeve 101 comprises a front panel 102, a sleeve rear panel 104, a side wall 110, an inner sleeve opening 111, a side strap 112, and a plurality of port openings 113. The front panel 102 is provided as the portion of the inner sleeve 101 that is coincident with the display screen of a mobile device. The sleeve rear panel 104 is provided as the portion of the inner sleeve 101 that is coincident with the rear section of a mobile device. The side wall 110 is provided as a flexible member that perimetrically couples the front panel 102 and the sleeve rear panel 104 together. The side wall 110 juxtaposes the front panel 102 and the sleeve rear panel 104 parallel to one another, forming an interstitial space that is appropriately sized for housing a mobile device. The inner sleeve opening 111 is provided as the entrance that permits access to the interstitial space between the front panel 102 and the sleeve rear panel 104. The side strap 112 is provided as a means of securing the mobile device within the interstitial space by spanning the inner sleeve opening 111 and inhibiting the mobile device exiting the inner sleeve 101. The plurality of port openings 113 are provided as a mean of accessing the mobile devices hardware keys and charging ports, but can additionally allow access to the mobile devices camera lens. The plurality of port openings 113 are found particularly positioned on the front panel 102, the sleeve rear panel 104, and the side wall 110, wherein the particular positioning of the plurality of port openings 113 is provided in order to enable access to hardware keys, camera lenses, and various ports present on a particular mobile device. The front panel 102 is found juxtaposed parallel to the sleeve rear panel 104. The front panel 102 is flexibly coupled to the sleeve rear panel 104 by way of the side wall 110. The inner sleeve opening 111 traverses the side wall 110 between the front panel 102 and the sleeve rear panel 104. The side strap 112 is found flexibly coupled to the front panel 102, wherein the side strap 112 is affixed to the front panel 102 but permitted to flex in order to span across the inner sleeve opening 111 and detachably couple the sleeve rear panel 104. In an embodiment of the invention, the front panel 102 comprises an open viewing area 103. The open viewing area 103 centrally traverses the front panel 102. The positioning 116 of the open viewing area 103 to the front panel 102 provides a frame configuration to the front panel 102 when aligned with the display portion of the mobile device.

Referencing FIGS. 21-22, and FIGS. 25-26, the sleeve rear panel 104 is the portion of the inner sleeve 101 that is coincident with the rear section of the mobile device. In an embodiment of the invention, the sleeve rear panel 104 comprises an outer case coupler 105, a hand strap 106, and a kickstand 107. The outer case coupler 105 is a complimenting component to a component on the outer enclosure 114 that enables a detachable and rotatable coupling between inner sleeve 101 and the outer enclosure 114. The hand strap 106 is provided as an integrated user manipulable engagement that facilitates holding and mobile device while housed within the inner sleeve 101. The kickstand 107 is an integrated component that is provided as means of inclining the mobile device housed within the inner sleeve 101 in order to function, exclusively, as a touch screen keyboard, wherein deployment of the kickstand 107 angles the mobile device in manner permitting a user's fingers facilitated engagement of the touch screen keys. The outer case coupler 105 is centrally positioned on the sleeve rear panel 104 opposite the front panel 102. The outer case coupler 105 is found positioned between the hand strap 106 and the kickstand 107. Both the hand strap 106 and the kickstand 107 are positioned flush with the sleeve rear panel 104, wherein both the hand strap 106 and the kickstand 107 do not protrude from the sleeve rear panel 104 in their resting state. In an embodiment of the invention, the kickstand 107 comprises a recessed flap 108 and a hinge 109. The recessed flap 108 is the structural portion of the kickstand 107 that pivots about the hinge 109 becoming perpendicular with the horizontal in order to incline the inner sleeve 101. The hinge 109 is the portion of the kickstand 107 that permits the hinge 109 to pivot. The hinge is found integrally coupled to the sleeve rear panel 104 and the recessed flap 108. The thing is positioned opposite the outer case coupler 105 across the recessed flap 108.

Figure 23:
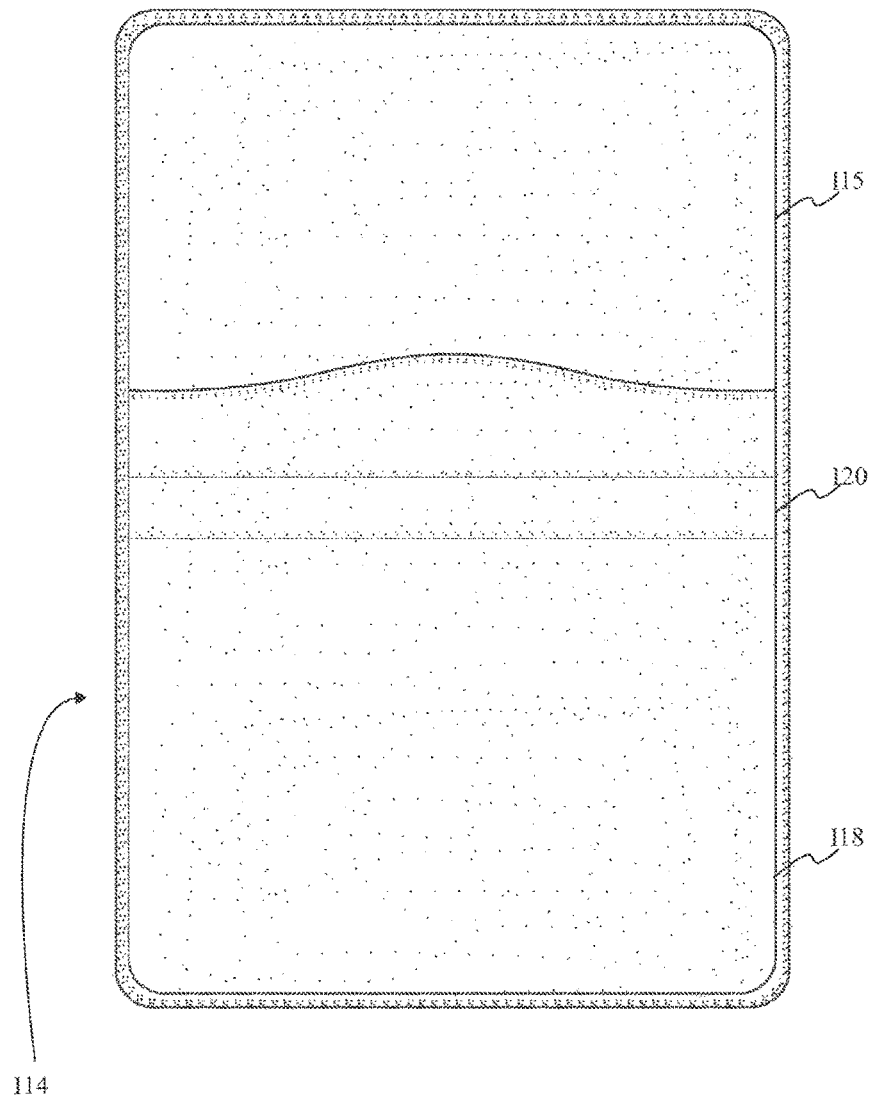
FIG. 23 is a bottom elevational view displaying the outer case as per an embodiment of the present invention.
Figure 24:
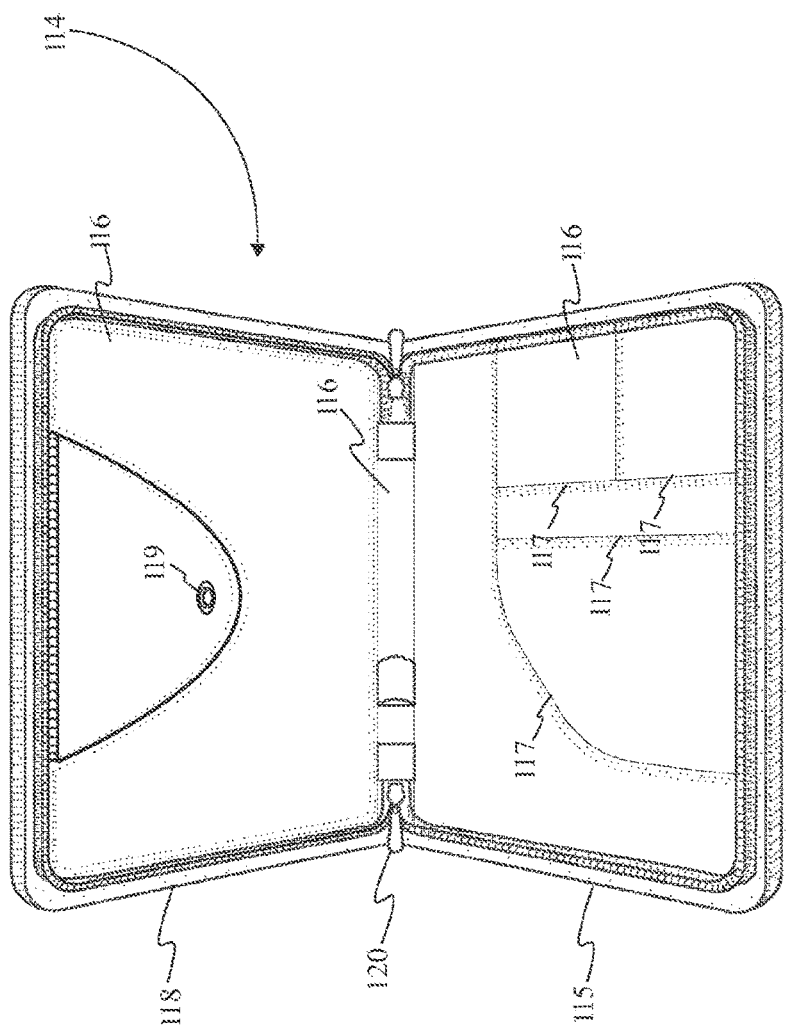
FIG. 24 is a perspective view displaying the outer case without as per an embodiment of the present invention.

Referencing FIG. 23 and FIG. 24, the outer enclosure 114 is provided as the secondary enclosure that protects the mobile device housed within the inner sleeve 101 from major wear and tear as well as accidental damage. In an embodiment of the invention, the outer enclosure 114 comprises a first outer flap 115, a second outer flap 118, and a sleeve fold 120. The first outer flap 115 and the second outer flap 118 are provided as functionally similar components that are pivotally coupled to each other through the sleeve fold 120. The first outer flap 115 and the second outer flap 118 are both rigid padded panels that protect the mobile device from major damage. The sleeve fold 120 is positioned between the first outer flap 115 and the second outer flap 118. In an embodiment of the invention, the first outer flap 115, the second outer flap 118, and the sleeve fold 120 each comprise an interior face side 116. The interior face side 116 of the first outer flap 115, the interior face side 116 of the second outer flap 118, and the interior face side 116 of the sleeve fold 120 are found positioned coincident to each other. The interior face side 116 is the side face of the first outer flap 115, the second outer flap 118, and the sleeve fold 120 that is positioned proximal to the inner sleeve 101. When the inner sleeve 101 is found removeably coupled within the outer enclosure 114, the interior face side 116 of the first outer flap 115, the interior face side 116 of the second outer flap 118 and the interior face side 116 of the sleeve fold 120 peripherally surround the inner sleeve 101. It should be noted that in an embodiment of the invention, the first outer flap 115 and the second outer flap 118 are engaged by a peripherally positioned coupler which engages the first outer flap 115 and the second outer flap 118 opposite the positioning of the sleeve fold 120, in order to provide a more secure enclosure.

Figure 25:
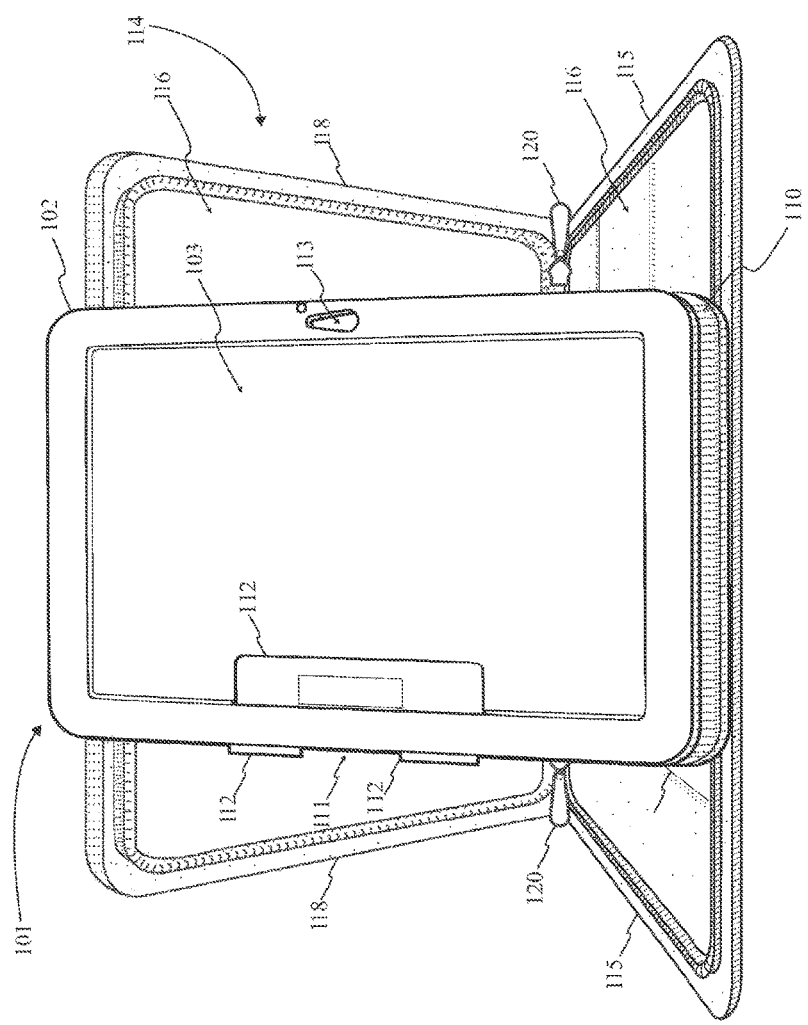
FIG. 25 is a perspective view displaying the inner sleeve mounted to the outer case in a portrait configuration as per an embodiment of the present invention.

Referencing FIG. 23, FIG. 24, and FIG. 25, the second outer flap 118 is provided as a rigid padded panel that functions in conjunction with the first outer panel and the sleeve fold 120 in order to protect the mobile device enclosed within the inner sleeve 101. In an embodiment of the invention, the interior face side 116 of the second outer flap 118 comprises an inner sleeve mount 119. The inner sleeve mount 119 is an engageable flap that is pivotably coupled to the interior face side 116 of the second outer flap 118. The inner sleeve mount 119 is a complimenting component to the outer case coupler 105 on the sleeve rear panel 104. The engagement between the outer case coupler 105 and the inner sleeve mount 119 enables a detachable and rotatable coupling between the sleeve rear panel 104 and the interior face side 116 of the second outer flap 118. While the engagement mechanism of the outer case coupler 105 and the inner sleeve mount 119 are not explicitly described, it should be noted that both the outer case coupler 105 and the inner sleeve mount 119 could be provided as any engagement mechanism that detachably and rotatably couples the inner sleeve 101 to the outer enclosure 114. In the preferred embodiment of the invention the outer case coupler 105 and the inner sleeve mount 119 are buckle fasteners.

In an embodiment of the present invention, the interior face side 116 of the first outer flap 115 comprises a plurality of accessory pockets 117. The plurality of accessory pockets 117 function as a convenient storage location for accessories of the mobile device as well as an alternative storage location for anything the user wishes to store. In an embodiment of the invention, the interior face side 116 of the sleeve fold 120 comprises an accessory mount. The accessory mount functions as an attachment point for storing a stylus or another kind of cylindrical accessory.

In an embodiment of the invention, the first outer flap 115 may additionally comprise a sleep mode activator. The sleep mode activator would provide the present invention with a means of putting the mobile device in sleep mode when the device is positioned within the outer enclosure 114. The sleep mode activator would be internally positioned within the first outer flap 115 and would activate sleep mode on a mobile device when the first outer flap 115 becomes parallel with the second outer flap 118.

The present invention is a mobile device enclosure system designed to protect mobile devices such as tablet computers, tablet PC, or any other tablet type electronic device including but not limited to various generations Apple iPad, Amazon Kindle, Nook, Acer Iconia Tab Tablet, Samsung Galaxy, Asus Transformer Pad, Lenovo IdeaPad K1, Lenovo ThinkPad 1838, LG G-Slate 8.9, Motorola DROID, Sony S1, and etc.

The present invention protects the mobile device from damages and scratches by encasing the mobile devices in a protective case. The mobile device enclosure system acts as an impact absorber and prevents internal damage to the electronics of the mobile device. This is due to the fact that electronic components of a mobile device, may fail if they are subjected to heavy vibrations or sudden impulses.

The present invention comprises an outer enclosure 114 and an inner sleeve 101. The inner sleeve 101 receives the mobile device. The present invention may utilize a plurality of Velcro strips, a plurality of magnets, and a plurality of grooves on the inside of the outer enclosure 114, a zipper, a plurality of holders, and a stand on the back of the inner sleeve 101. The present invention may have a logo that is preferably stamped on the outer enclosure 114, although any desired printing method may be used.

The present invention is preferably constructed using genuine cowhide leather on the outside of the outer enclosure 114, although any desired material may be used. The interior face side 116 of the outer enclosure 114 and the interior portion of the inner sleeve 101 are constructed of micro suede, although any desired material may be used. The micro suede material provides a smooth and soft cushion for the mobile device. The present invention utilizes a rigid 130 internal material to create a structurally strong outer enclosure 114 and inner sleeve 101. The cowhide and micro suede are preferably stitched together and sandwich the rigid internal material 119 in the middle to create a sturdy shape, although any desired means of attachment may be used.

The outer case and the inner sleeve 101 comprise a plurality of port openings 113 that that are strategically placed in conjunction with cameras, light sensors, and other ports on each specific mobile device. These ports include but are not limited to charging ports, headphone jacks, speaker ports, and etc. The plurality of port openings 113 allow the user to still utilize the camera and other ports on the mobile device without having to remove the inner sleeve 101 and outer enclosure 114. The sleeve fold 120 also comprises an accessory mount on the right flap to allow the user to attach and store a stylus or a pen.

In an additional embodiment of the present invention comprises a built in stand features would be provided on the outer enclosure 114 in order to allow the user to view the mobile device in multiple angles. The first outer flap 115 would comprise a plurality of grooves on the interior face side 116 that would permit the orientation of the mobile device into a plurality of different viewing angles.

In an additional embodiment of the invention, a large strip of Velcro would be sewn into the interior face side 116 of the second outer flap 118 to attach the inner sleeve 101 in a landscape and/or a portrait view. The inner sleeve 101 rests on the grooves to provide a wide variety of viewing angles for the user. The different viewing angles may be adjusted by moving the inner sleeve 101 forwards or backwards along a groove plate until an edge of the inner sleeve 101 falls into one of the groove.

In an additional embodiment of the invention, the interior face side 116 of the second outer flap 118 would comprises a fold positioned below the large strip of Velcro to convert the outer enclosure 114 into a stand. The fold comprises stitching along the groove to provide a solid hold and prevents separation.

In an additional embodiment of the invention, the second outer flap 118 would comprise a plurality of folds permitting it to bends in the middle. The second outer flap 118 would be able to wrap around the back to create a folded down flat configuration for the user to view and use the mobile device.

In an additional embodiment of the invention, the inner sleeve 101 is constructed of genuine cowhide leather, although any desired material may be used. The interior portion of the inner sleeve 101 is lined with soft felt material to avoid scratching the device. The sleeve rear panel 104 of the inner sleeve 101 is lined with the same felt material to attach and detach from outer case for handheld operation and to manipulate the tablet in a portrait and/or a landscape view.

In in an additional embodiment of the invention, the inner sleeve 101 comprises a sewn on leather flap that holds a strip of Velcro hook and a Velcro loop sewn on the interior portion of the inner sleeve 101 in order to secure the tablet while inside sleeve.

In an additional embodiment of the invention, a plurality of magnets are positioned underneath the suede like material on the peripheral edges of the first outer flap 115 and the second outer flap 118. The magnetic flap closure would able to secure mobile device within the outer enclosure 114. The magnetic flap closure may also automatically sleeps and wakes the new iPad 2 and iPad 3 devices.

In an alternative embodiment of the invention, the outer enclosure 114 would utilize a dual zipper for easy access, a detachable inner sleeve 101 for handheld operation, a plurality of slots with accessory flaps, and a rear stand for comfortable viewing at a 45° degree 15 angle. In the alternative embodiment of the invention, a large strip of Velcro would be sewn into the interior face side 116 of second outer flap 118. The large strip of Velcro would be used to attach the inner sleeve 101 case in landscape and/or portrait views. In the alternative embodiment of the invention, the outer enclosure 114 comprises a decorative stitching pattern to give the case a unique and attractive look.

In an alternative embodiment of the invention, the center portion of the outer enclosure 114 comprises a sleeve fold 120 that bends in the middle to close the case. Along with the sleeve fold 120, the alternative embodiment comprises a dual zipper that secures the case and prevents any accidental separation.

In an alternative embodiment of the invention, the outer enclosure 114 comprises a rear stand that is attached on the exterior side face of the second outer flap 118 to allow a 45° degree viewing angle. The rear stand comprises a strap that prevents the stand from separating from the case. The rear stand also comprises a plurality of magnets that are attached in the stand and the case to hold the stand in a flat configuration when the stand is not in use.

In an alternative embodiment of the invention, the inner sleeve 101 comprises a sewn on leather flap in order secure the mobile device while stored in the inner sleeve 101. The inner sleeve 101 utilizes a plurality of port openings 113 that are purposefully placed in combination with cameras ports, light sensors, and other ports on each specific electronic device.

Referencing FIG. 27, the first flap 13 and the second flap 16 are both rigid padded panels that protect the mobile device from major damage. The folding region 31 is positioned between the first flap 13 and the second flap 16. The present invention is preferably constructed using genuine cowhide leather 2703 on the outside of the outer case, although any desired material may be used. The interior face side of the outer case is constructed of micro suede 2701, although any desired material may be used. The micro suede material 2701 provides a smooth and soft cushion for the mobile device (not shown). The present invention utilizes a rigid internal material 2702 to create a structurally strong outer case. The cowhide 2703 and micro suede 2701 are preferably stitched together and sandwich the rigid internal material 2702 in the middle to create a sturdy shape, although any desired means of attachment may be used.

The portions outside of the pairs of jagged lines at the edges of FIG. 27 are broken away to indicate no particular length or width, and such pairs of jagged lines themselves form no part of the invention. The materials that may have been visible beyond the jagged lines have been removed for clarity. The thickness of the elements in FIG. 27 is not intended to show the relative thickness of the various materials, but rather the layered arrangement of the materials with respect to one another.

Referencing FIG. 28, the case mount 5 of FIG. 6 is shown with additional clarifying markings. As can be seen in FIG. 28, case mount 5 comprises at least an inner circular rim 36*a* and an outer circular rim 36*b*. A dot illustrates center point Z, which is the conceptual center point of the circles coincident with circular rim 36*a* and circular rim 36*b*. Center point Z is not meant to illustrate a physical structure, but rather the location of the conceptual center point. As defined mathematically, the arc of a circle is a portion of the circumference of a circle. One of ordinary skill using ordinary language will recognize that the inner circle 36*a* can be divided into or referred to as containing any number of portions that are coradial arcs of a circle coincident with circular rim 36*a*. Each of these portions is a portion of the case mount 5 or a "case mount portion." For example, one portion of that circle may extend in an arcuate fashion from point A to point H, another portion of that circle may extend in an arcuate fashion from point B to point C, another portion of that circle may extend in an arcuate fashion from point D to point E, another portion of that circle may extend in an arcuate fashion from point F to point G, and so on. In another example, one portion of that circle may extend in an arcuate fashion from point A to point D, another portion of that circle may extend in an arcuate fashion from point C to point F, another portion of that circle may extend in an arcuate fashion from point E to point H, another portion of that circle may extend in an arcuate fashion from point G to point B, and so on. Because the case mount 5 is part of the structure for coupling the inner case 1 to the outer case 12, one of ordinary skill would understand referring to the portions of the rim 36*a* as case mount portions. For example, one of ordinary skill might refer to the portion of rim 36*a* between points B and C as a first case mount portion, to the portion of rim 36*a* between points D and E as a second case mount portion, to the portion of rim 36*a* between points F and G as a third case mount portion, and to the portion of rim 36*a* between points H and A as a sixth case mount portion. And one might refer to the notch mount 8 on the first case mount portion as a first notch mount, to the notch mount 8 on the second case mount portion as a second notch mount, to the notch mount 8 on the third case mount portion as a third notch mount, and to the notch mount 8 on the fourth case mount portion as a fourth notch mount.

As can be seen in FIG. 28, pairs of notch mounts 8 may be formed on the circular rim 36*a* such that they are aligned opposite to one another with respect to center point Z of the circle coincident with rim 36*a*. For example, the notch mount 8 located on the arcuate portion of rim 36*a* between points A and H is aligned opposite to the notch mount 8 located on the arcuate portion of rim 36*a* between points D and E, with respect to the center point Z. And the notch mount 8 located on the arcuate portion of rim 36*a* between points B and C is aligned opposite to the notch mount 8 located on the arcuate portion of rim 36*a* between points F and G, with respect to the center point Z. Further, as can be seen, the notch mounts 8 are preferably located at least 30 degrees from each other about the circumference of the circle coincident with rim 36*a*. As illustrated, each notch mount is placed approximately 90 degrees from the next notch mount about the circle coincident with rim 36*a*.

As illustrated in FIGS. 1, 4, 5, 6, 7, 8, 9, 13, 16, 17 and 18, the side wall 10 comprise a beveled edge 35 that may partially or completely surround the display screen (not illustrated) of an inserted electric device (not illustrated).

As illustrated in FIGS. 1-5, 7-11, and 13-18, the inner case coupler 19 comprises multiple circular rims. Referring to FIGS. 1, 5, 7, and 17, for example, a first inner case coupler circular rim 40 always maintains a circular form. However, as is apparent from FIGS. 7-11, a second inner case coupler circular rim comprising movable portions 41*a* and 41*c*, portions 41*b* and 41*d* (hidden from view in FIG. 7) does not always maintain its circular form. The second inner case coupler circular rim formed of portion 41*a* on coupler 24, portions 41*b* and 41*d* on housing 21, and portion 41*c* on coupler 25 displays its circular form when first coupler 24 and second coupler 25 are compressed toward housing 21 when engaging the case mount 5 or disengaging from the case mount 5. However, when first coupler 24 and second coupler 25 are not compressed, the various arcs forming circular rim portions 41*a*, 41*b*, 41*c*, and 41*d* are offset and appear as co radial arcs, but do not appear to form a circle.

Although the invention has been explained in relation to its preferred embodiment, it is to be understood that many other possible modifications and variations can be made without departing from the spirit and scope of the invention as hereinafter claimed.

What is claimed is:
1. A mobile device enclosure system comprising:
 an inner case
 comprising a rear panel, a side wall, and a plurality of port openings; and
 an outer case comprising a first flap, a second flap, and a folding region, wherein:
  the rear panel comprises a case mount,
  the first flap, the second flap, and the folding region each comprise an interior face side, the interior face side of the second flap comprises an inner case coupler for coupling with the case mount, the inner case being rotatably couplable to the outer case using the inner case coupler and the case mount, wherein:
the inner case coupler comprises:
a) a first circular rim, and
b) a first inner case coupler portion and second inner case coupler portion that are each coradial arcs of a first circle associated with the inner case coupler arranged on opposite sides of a first center point of the first circle, wherein the first portion comprises a first notch, the second portion comprises a second notch, and the first notch is aligned opposite the notch with respect to the first center point, and
the case mount comprises:
a) a second circular rim, and
b) a first case mount portion, a second case mount portion, a third case mount portion, and a fourth case mount portion, wherein the first case mount portion comprises a first notch mount, the second case mount portion comprises a second notch mount, the third case mount portion comprises a third notch mount, and the fourth case mount portion comprises a fourth notch mount, wherein the first case mount portion, the second case mount portion, and the third case mount portion are each coradial arcs of a second circle arranged about the circumference of the second circle, wherein the first notch mount is aligned opposite the third notch mount with respect to a second center point of the second circle, and the second notch mount is aligned opposite the fourth notch mount with respect to the second center point of the second circle, such that when the inner case is coupled to the outer case, the positions of the first notch, second notch, first notch mount, second notch mount, third notch mount, and fourth notch mount allow at least two secure alignments of the inner case with respect to the outer case.

2. The mobile device enclosure system as claimed in claim 1, further comprising:
the folding region being positioned between the first flap and the second flap;
the first flap being pivotally coupled to the second flap by way of the folding region;
the interior face side of the first flap, being coincident with the interior face side of the folding region, and the interior face side of the second flap;
the inner case being peripherally surrounded by the interior face side of the first flap, the interior face side of the folding region, and the interior face side of the second flap; and
the rear panel being detachably coupled to the interior face of the second flap.

3. The mobile device enclosure system as claimed in claim 1, wherein the outer case is configured such that the second flap may be positioned to cover the rear panel when the inner case is coupled to the outer case.

4. The mobile device enclosure system as claimed in claim 1, wherein the side wall surrounds the entire perimeter of an open viewing area.

5. The mobile device enclosure system as claimed in claim 4, wherein the side wall comprises a beveled edge surrounding the open viewing area.

6. The mobile device enclosure system as claimed in claim 1, wherein:
the plurality of port openings are positioned on one or more of the side wall and the rear panel;
the side wall is formed to laterally engage an inserted mobile device without obstructing a display screen of the mobile device and to surround the entire perimeter of the display screen; and
the rear panel is perimetrically engaged to the side wall.

7. The mobile device enclosure system as claimed in claim 1, further comprising:
the case mount being centrally positioned on the rear panel; and
wherein the case mount comprises a circular rim and a circular opening that extends through the rear panel.

8. The mobile device enclosure system as claimed in claim 1, wherein the interior face side of the first flap comprises micro suede.

9. The mobile device enclosure system as claimed in claim 8, wherein the outer case comprises:
at least one section of rigid internal material; and
an outer covering, and wherein
each of the at least one section of rigid internal material is sandwiched between the micro suede and the outer covering.

10. The mobile device enclosure system as claimed in claim 1, wherein the plurality of port openings comprise:
a first port opening for a camera;
a second port opening for a charging port;
a third port opening for a hardware key; and
a fourth port opening for a headphone jack.

11. The mobile device enclosure system as claimed in claim 1, further comprising:
a groove on the interior face side of the first flap;
wherein a built in stand may be formed by folding the first flap along the groove;
wherein the built in stand permits orientation of the inner case into a plurality of viewing angles; and
a second groove on the interior face side of the second flap;
wherein the second groove permits bending of the second flap.

12. The mobile device enclosure system as claimed in claim 1, further comprising:
a magnet embedded within the first flap.

13. The mobile device enclosure system as claimed in claim 12, wherein the magnet forms a portion of a magnetic flap closure.

14. The mobile device enclosure system as claimed in claim 12, wherein the magnet is positioned to interact with a mobile device that may be inserted within the enclosure.

15. The mobile device enclosure system as claimed in claim 14, wherein the magnet is positioned to activate a sleep function or a wake function on a mobile device that may be inserted within the enclosure.

16. A mobile device enclosure system comprising:
an inner case; and
an outer case, wherein:
the inner case comprises a rear panel, a side wall, and a plurality of port openings;
the outer case comprises a first flap, a second flap, and a folding region,
the rear panel comprises a case mount centrally positioned on the rear panel, the case mount comprising a circular rim,
the first flap, the second flap, and the folding region each comprise an interior face side, the interior face side of the second flap comprises an inner case coupler for coupling with the case mount, the inner case coupler comprising a circular rim, and the inner case being rotatably couplable to the outer case using the inner case coupler and the case mount, wherein:

the outer case is configured such that the first flap may be positioned to cover a display screen of an inserted mobile device when the inner case is coupled to the outer case, the inner case coupler further comprises a first notch and a second notch, a first protruding notch, wherein the first notch is aligned opposite the second notch with respect to a first center point of a first circle associated with the inner case coupler, and the case mount further comprises a first case mount portion, a second case mount portion, a third case mount portion, and a fourth case mount portion, wherein the first case mount portion comprises a first notch mount, the second case mount portion comprises a second notch mount, the third case mount portion comprises a third notch mount, and the fourth case mount portion comprises a fourth notch mount, that are each coradial arcs of a second circle associated with the case mount arranged about the circumference of the second circle, wherein the first notch mount is aligned opposite the third notch mount with respect to a second center point of the second circle, the second notch mount is aligned opposite the fourth notch mount with respect to the second center point of the second circle, such that when the inner case is coupled to the outer case, the positions of the notches and notch mounts allow at least two secure alignments of the inner case with respect to the outer case.

17. The system of claim 16,
wherein the case mount comprises a circular rim and a circular opening that extends through the rear panel, and
wherein the first case mount portion, the second case mount portion, the third case mount portion, and the fourth case mount portion are beveled at complementary angles for coupling of the outer case to the inner case.

18. A mobile device enclosure system comprising:
an inner case; and
an outer case, wherein:
the inner case comprises a rear panel, a side wall, and a plurality of port openings,
the outer case comprises a first flap, a second flap, and a folding region,
the rear panel comprises a case mount centrally positioned on the rear panel, the case mount comprising a circular rim,
the first flap, the second flap, and the folding region each comprise an interior face side, wherein the interior face side of the first flap comprises micro suede, the interior face side of the second flap comprises an inner case coupler for coupling with the case mount, the inner case coupler comprising a circular rim, the inner case is rotatably couplable to the outer case using the inner case coupler and the case mount, and wherein, the outer case is configured such that the first flap may be positioned to cover a display screen of an inserted mobile device when the inner case is coupled to the outer case, wherein the outer case comprises
at least one section of rigid internal material and
an outer covering, and wherein
the at least one section of rigid internal material is sandwiched between the micro suede and the outer covering, and wherein the side wall is formed to laterally engage an inserted mobile device without obstructing a display screen of the mobile device and to surround the entire perimeter of the display screen except where the sidewall is excised by one or more port openings.

19. The system of claim 18, wherein the inner case coupler further comprises:

a first coupler portion and a second coupler portions that are each coradial arcs of a first circle associated with the inner case coupler arranged on opposite sides of a first center point of the first circle, wherein the first portion is intersected by a first notch, the second portion is intersected by a second notch, and the first notch is aligned opposite the second notch with respect to the first center point; and wherein the case mount further comprises:

a first case mount portion, a second case mount portion, a third case mount portion, and a fourth case mount portion, wherein the first case mount portion comprises a first notch mount, the second case mount portion comprises a second notch mount, the third case mount portion comprises a third notch mount, and the fourth case mount portion comprises a fourth notch mount, wherein the first notch mount is aligned opposite the third notch mount with respect to a second center point of a second circle associated with the case mount, and the second notch mount is aligned opposite the fourth notch mount with respect to the second center point of the second circle, such that when the inner case is coupled to the outer case, the positions of the notches and notch mounts allow at least two secure alignments of the inner case with respect to the outer case.

20. The system of claim 19, wherein the inner case coupler and the case mount are configured to permit rotatable coupling if the inner case coupler is caused to approach and engage the case mount along a first axis extending perpendicular to a plane defined by the first circle and along a second axis extending perpendicular to the plane defined by the second circle, wherein rotatable coupling is permitted regardless of the orientation of the protruding notches relative to the notch mounts when engagement occurs.

* * * * *